United States Patent
Vangala et al.

(10) Patent No.: US 12,111,857 B2
(45) Date of Patent: Oct. 8, 2024

(54) COMPUTERIZED ASSISTANCE USING ARTIFICIAL INTELLIGENCE KNOWLEDGE BASE

(71) Applicant: Microsoft Technology Licensing, LLC, Redmond, WA (US)

(72) Inventors: Vipindeep Vangala, Hyderabad (IN); Sundararajan Srinivasan, Hyderabad (IN); Rajesh Gunda, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/154,551

(22) Filed: Jan. 13, 2023

(65) Prior Publication Data

US 2023/0161798 A1    May 25, 2023

Related U.S. Application Data

(63) Continuation of application No. 15/952,054, filed on Apr. 12, 2018, now Pat. No. 11,593,413.

(51) Int. Cl.
*G06F 16/332* (2019.01)
*G06F 16/901* (2019.01)
*G06N 5/022* (2023.01)

(52) U.S. Cl.
CPC ...... *G06F 16/3329* (2019.01); *G06F 16/9024* (2019.01); *G06N 5/022* (2013.01)

(58) Field of Classification Search
CPC ............ G06F 16/3329; G06F 16/9024; G06N 5/022
(Continued)

(56) References Cited

U.S. PATENT DOCUMENTS 11,593,413 B2    2/2023  Vangala et al.
2012/0197911 A1*  8/2012  Banka ................... G06F 16/951
                                                    707/754

(Continued)

FOREIGN PATENT DOCUMENTS

CN    104937612 A    9/2015
MX    2020010615 A   10/2020
(Continued)

OTHER PUBLICATIONS

Wu, et al. KDA: A knowledge-based database assistant, Fifth International Conference on Data Engineering, Feb. 6-10, 1989 (Year: 1989).*
"Office Action Issued in Russian Patent Application No. 2020136934", Mailed Date: Oct. 21, 2022, 10 Pages.
(Continued)

*Primary Examiner* — Tsu-Chang Lee
(74) *Attorney, Agent, or Firm* — Shook, Hardy & Bacon L.L.P.

(57) ABSTRACT

A computerized personal assistant includes a natural language user interface, a natural language processing machine, an identity machine, and a knowledge-base updating machine. The knowledge-base updating machine is configured to update a user-centric artificial intelligence knowledge base associated with the particular user to include a new or updated user-centric fact based on the computer-readable representation of the user input, wherein the knowledge-base updating machine updates the user-centric artificial intelligence knowledge base via an update protocol useable by a plurality of different computer services.

20 Claims, 19 Drawing Sheets

(58) Field of Classification Search
USPC .......................................................... 706/45
See application file for complete search history.

(56) References Cited

U.S. PATENT DOCUMENTS

2017/0024375 A1* 1/2017 Hakkani-Tur ........ G06F 16/337
2017/0097984 A1   4/2017 Haldar

FOREIGN PATENT DOCUMENTS

RU          2353068 C2   4/2009
RU          2556416 C2   7/2015

OTHER PUBLICATIONS

"Notice of Allowance Issued in Indonesian Patent Application No. P00202007300", Mailed Date: Jul. 31, 2023, 4 Pages.

"Notice of Allowance Issued in Australian Patent Application No. 2019253187", Mailed Date: Sep. 18, 2023, 3 Pages.

"Office Action Issued in Australian Patent Application No. 2019253187", Mailed Date: Jul. 27, 2023, 3 Pages.

"Office Action Issued in European Patent Application No. 19716710.9", Mailed Date: Jan. 17, 2023, 6 Pages.

"Office Action Issued in Indonesia Patent Application No. P00202007300", Mailed Date: May 4, 2023, 8 Pages.

"Examiner's Decision of Final Refusal Issued in Japanese Patent Application 2020-547011", Mailed Date: Jul. 10, 2023, 11 Pages.

"Notice of Allowance and Search Report Issued in Russian Patent Application No. 2020136934", Mailed Date: Mar. 16, 2023, 25 Pages.

"Office Action Issued in Japnese Patent Application No. 2020-547011", Mailed Date: Mar. 29, 2023, 9 Pages.

"Office Action Issued in Israel Patent Application No. 277864", Mailed Date: Mar. 16, 2023, 4 Pages.

Office Action Received for Mexican Application No. MX/a/2020/010615, mailed on Dec. 14, 2023, 8 pages.

Office Action Received for Israel Application No. 277864, mailed on Mar. 25, 2024, 04 pages.

Office Action Received for Korean Application No. 10-2020-7029202, mailed on Apr. 23, 2024, 12 pages (English Translation Provided).

Notice of Reasons for Refusal received in Japanese Application No. 2020-547011, mailed on Apr. 19, 2024, 20 pages.

Office Action Received for Japanese Application No. 2020-547011, mailed on May 1, 2024, 9 pages.

Office Action Received for Mexican Application No. MX/a/2020/010615, mailed on Apr. 25, 2024, 3 pages.

Communication under Rule 71(3) received in European Application No. 19716710.9, mailed on Jun. 20, 2024, 09 pages.

Office Action Received for Chinese Application No. 201980025282.1, mailed on Jun. 7, 2024, 10 pages (English Translation Provided).

Office Action Received for Japanese Application No. 2020-547011, mailed on Aug. 7, 2024, 12 pages.

Office Action Received for Malaysian No. PI2020005230, mailed on Jul. 24, 2024, 05 pages (English Translation Provided).

* cited by examiner

COMPUTERIZED ASSISTANCE USING ARTIFICIAL INTELLIGENCE KNOWLEDGE BASE

CROSS-REFERENCE TO RELATED APPLICATION

This application is a Continuation of U.S. patent application Ser. No. 15/952,054, filed on Apr. 12, 2018, the entire contents of which are incorporated by reference herein.

BACKGROUND

Artificial intelligence is an emerging field with virtually limitless applications. It is believed that user-centric artificial intelligence applications will be of great utility to individual computer users as artificial intelligence technology advances. The creation and maintenance of robust artificial intelligence knowledge bases has been a significant hurdle to providing useful artificial intelligence applications for individual computer users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computerized personal assistant includes a natural language user interface, a natural language processing machine, an identity machine, and a knowledge-base updating machine. The knowledge-base updating machine is configured to provide user-centric facts to a user-centric artificial intelligence knowledge base associated with a user. The user-centric artificial intelligence knowledge base is updated via an update protocol useable by a plurality of different computer services, and/or serves queries via a query protocol useable by a plurality of different computer services.

DETAILED DESCRIPTION

Figure 1A:
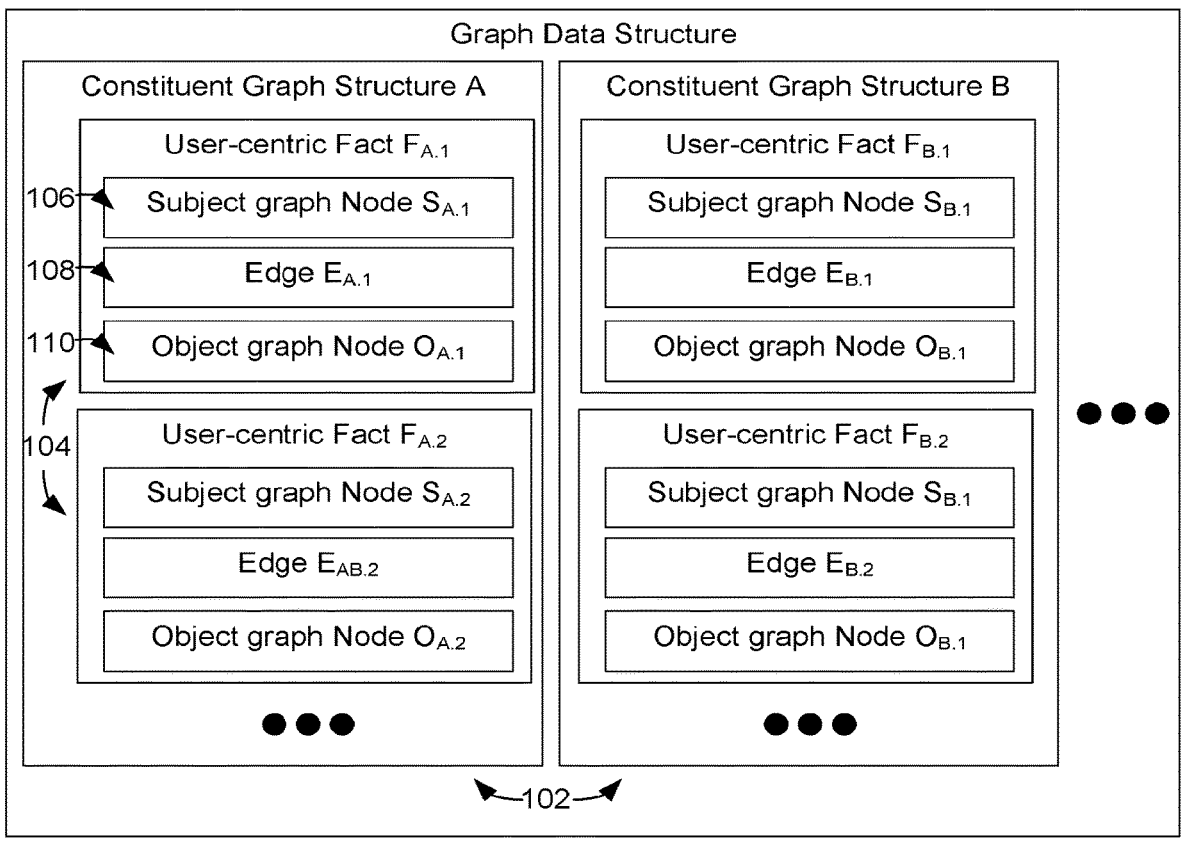
FIGS. 1A-1B show a simplified graph data structure including a small plurality of user-centric facts.

A computer service may enhance interaction with a user by collecting and/or analyzing user-centric data. As used herein, a "computer service" broadly refers to any software and/or hardware process with which a user may interact directly, or indirectly via interaction with another computer service, e.g., a software application, an interactive web site, or a server implementing a communication protocol. As used herein, "user-centric" broadly refers to any data associated with or pertaining to a particular computer user (e.g., facts and/or computer data structures representing user interests, user relationships, and user interaction with a computer service).

User-centric data may be supplied as input to an artificial intelligence (AI) program, which may be configured to provide enhanced interactions between the user and a computer based on analysis of the supplied user-centric data. For example, providing enhanced interactions may include predicting an action the user is likely to take, and facilitating that action. However, to meaningfully enhance interactions between a user and a computer, AI programs require a very large amount of data. Furthermore, the data must be centrally available in a suitable data format.

For example, a computerized personal assistant may include a natural language processing engine for processing natural language queries submitted by a user (e.g., by a natural user interface (NUI) configured to receive audio and/or textual natural language queries, such as a natural language user interface). To serve a natural language query, a computerized personal assistant requires a knowledge base of facts. In some implementations, a "knowledge base" may include a collection of facts expressed as subject-predicate-object triples. Knowledge bases may be generated using a combination of human-labeled data and data-mining techniques to aggregate information from public sources such as the Internet. Previous approaches for building knowledge bases have posed a very large computational burden (e.g., to run a data mining task for each of a plurality of different users), and/or extensive human design and oversight (e.g., hand-labelled data) to achieve a good result.

As such, previous approaches for building and maintaining knowledge bases may be unsuitable for leveraging AI to provide enhanced user interactions with computer. In contrast, user-centric AI knowledge bases as described herein extend the idea of knowledge bases to support collections of user-centric facts relating to one or more specific users (e.g., an individual computer user, or a group of users of an enterprise computer network). The user-centric AI knowledge base may include user-centric facts arising from a variety of different application-specific data providers (e.g., a data provider associated with a computerized personal assistant, and a data provider associated with an address book program). The user-centric AI knowledge base may efficiently store a plurality of user-centric facts by distributing the storage of the user-centric facts across a plurality of storage locations, e.g., associated with different applications. Furthermore, the user-centric AI knowledge base may include a variety of application-agnostic enrichments to the user-centric facts that may facilitate AI processing of the knowledge base, e.g., answering queries.

A single user may interact with a plurality of different computer services, which may each recognize and store information regarding the user. Computer services may aggregate data related to interaction with the user, and the plurality of differently computer services may collectively aggregate a large amount of data regarding the user. Each computer service of the plurality of computer services may store information regarding the user to a different, application-specific location. "Application-specific" is used herein to mean specific to any computer service. Furthermore, each computer service of the plurality of computer services may recognize and store only a limited subset of possible information regarding the user, different from the information stored by different computer services of the plurality of computer services. As such, information regarding the user may be distributed across a plurality of different storage locations.

Furthermore, application-specific data associated with a computer service may be stored in an application-specific storage format. As such, even when two different computer services have related functionality, the computer services may be unable to share data. In some cases, a first-party provider provides a suite of related computer services (e.g., a document editing suite) which may share a storage format. However, even if computer services within such a suite are able to share data with each other, utilizing the data to enhance interaction with the user may further depend on data from external knowledge sources, such as global knowledge sources (e.g., the Internet), third-party software applications provided by a different, third-party software provider, and/or usage data of other users (e.g., in the context of an enterprise software application, or in the context of a social network application).

A software provider may wish to automatically aggregate information from disparate sources in order to build a user-centric AI knowledge base, to facilitate improved interactions with a user. However, previous approaches to building AI knowledge bases have only focused on global data, not user-centric data which may be particularly utilized in the context of interactions with a particular user. As such, previous approaches to building knowledge bases are unsuitable for building a user-centric AI knowledge base for a user of a plurality of computer services.

FIG. 1A shows an exemplary graph data structure 100 for representing a collection of user-centric facts, which may be associated with application-specific data distributed across a plurality of different computer services. The graph data structure 100 allows centralized queries and is suitable for implementing a user-centric AI knowledge base.

The graph data structure 100 includes a plurality of different constituent graph structures 102, e.g., constituent graph A, constituent graph B, etc. Each constituent graph structure may be an application-specific constituent graph structure associated with a different computer service. For example, application-specific constituent graph structure A may be associated with a schedule planning program, while application-specific constituent graph structure B may be associated with an email program.

Each constituent graph structure includes a plurality of user-centric facts 104, e.g., user-centric facts $F_{A.1}$, $F_{A.2}$, etc. stored in constituent graph A, and user-centric facts $F_{B.1}$, $F_{B.1}$, etc. stored in constituent graph B. A user-centric fact includes a subject graph node 106, an object graph node 108, and an edge 110 connecting the subject graph node to the object graph node. Subject graph nodes and object graph nodes may be generically referred to as nodes. Nodes may represent any noun, where "noun" is used to refer to any entity, event, or concept, or any suitable application-specific information (e.g., details of a previous action performed by the user using the computer service). Similarly, "subject noun" and "object noun" are used herein to refer to nouns which are represented by a subject graph node or by an object graph node respectively. Representing the collection of user-centric facts as a graph data structure may facilitate manipulating and traversing the graph data structure (e.g., to respond to a query).

Figure 1B:
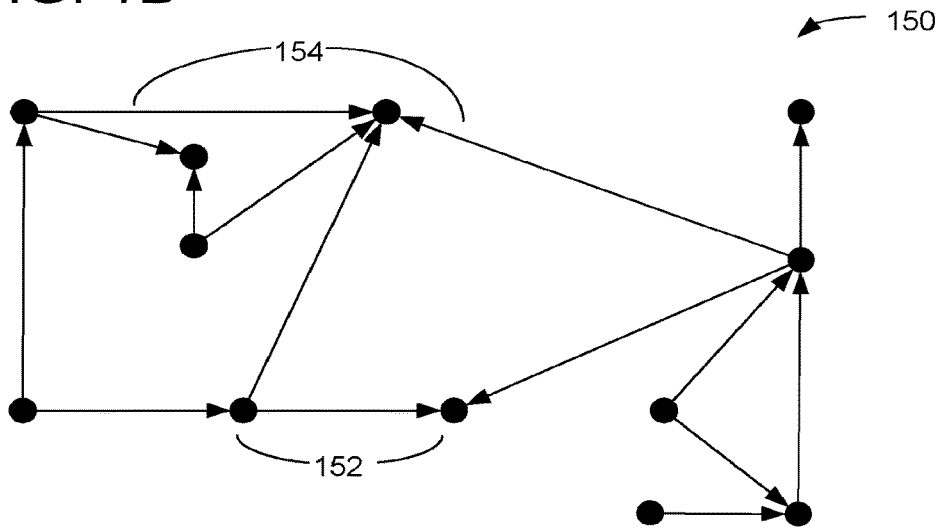

It is instructive to visualize the collection of user-centric facts as a graph 150 as in FIG. 1B. In the graph 150 depicted in FIG. 1B, nodes 152 are depicted as filled circles and edges 154 are depicted as arrows. Filled circles with an outgoing edge (where the arrow points away from the filled circle) depict subject graph nodes, while filled circles with an incoming edge (where the arrow points towards the filled circle) depict object graph nodes. The multiple constituent graphs may be treated as a single graph by regarding edges between constituent graphs as edges in the larger graph. Accordingly, FIG. 1B shows a single combined graph 150 including a plurality of constituent graph structures. To simplify explanation, example graph 150 only includes two constituent graphs with twelve nodes. In actual implementations, a user centric graph will include many more nodes (e.g., hundreds, thousands, millions, or more) spread between many more constituent graphs.

Figure 2A:
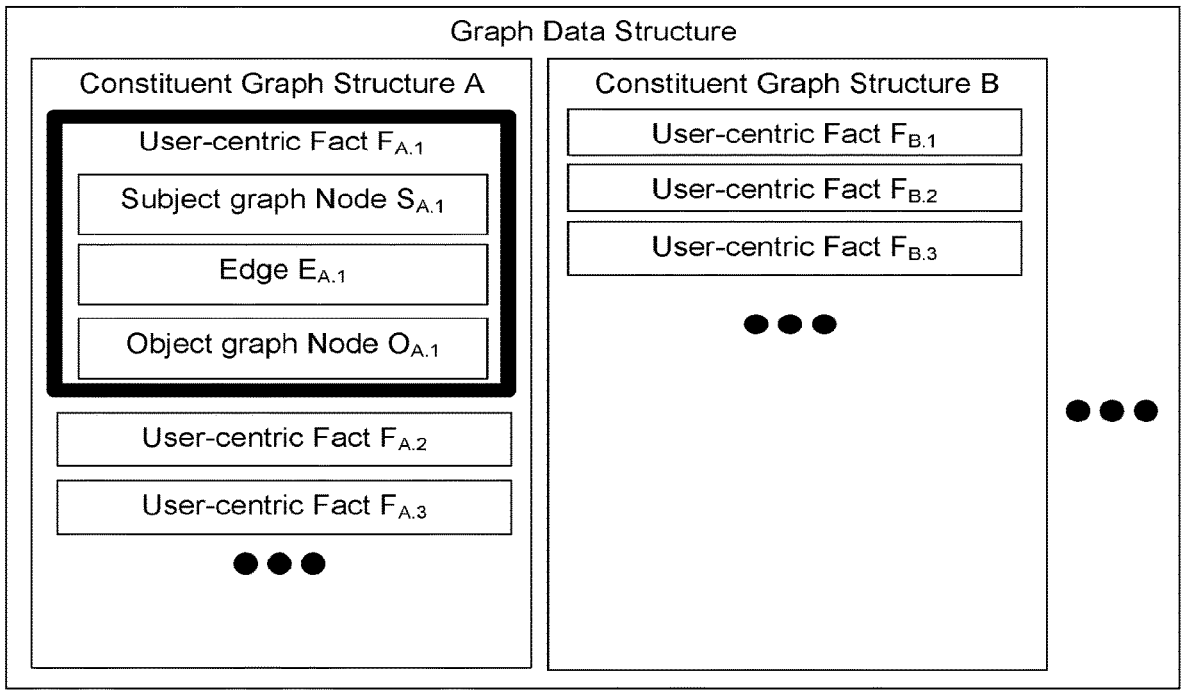
FIGS. 2A-6B show the graph data structure of FIGS. 1A and 1B, focusing on particular user-centric facts.
Figure 2B:
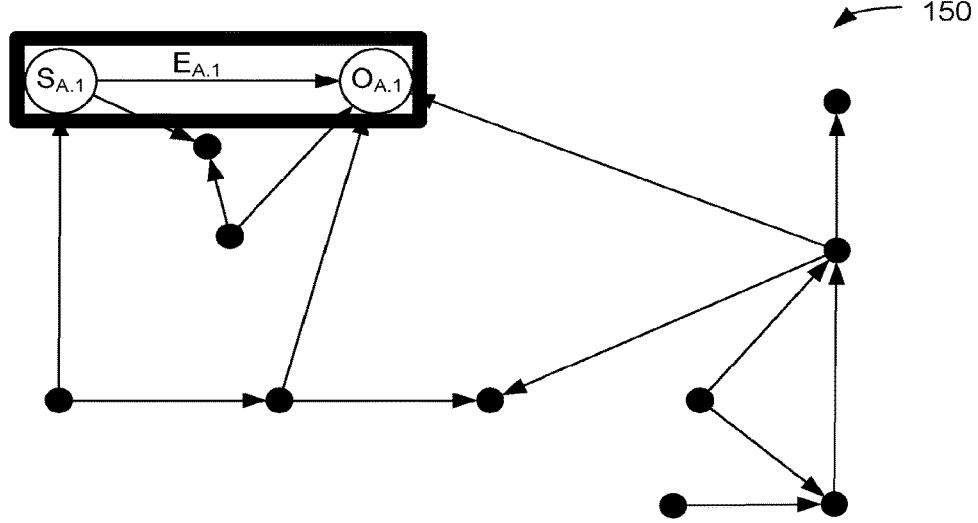

FIGS. 2A-2B depict the graph data structure of FIGS. 1A-1B, focusing on a particular user-centric fact $F_{A.1}$. User-centric fact $F_{A.1}$ is surrounded by a thick-lined rectangle in FIG. 2A, and other user-centric facts of the graph data structure are not shown in detail in FIG. 2A. Thick lined shapes are similarly used to call attention to particular facts in subsequent drawings. User-centric fact $F_{A.1}$ includes subject graph node $S_{A.1}$, edge $E_{A.1}$, and object graph node $O_{A.1}$. For example, subject graph node $S_{A.1}$ may represent the user's employer and object graph node $O_{A.1}$ may represent a task assigned to the user by her employer. The edge $E_{A.1}$ may describe any suitable relationship between subject graph node $S_{A.1}$ and object graph node $O_{A.1}$. In the above example, edge $E_{A.1}$ may represent an "assigned new task" relationship. The subject-edge-object triple of user-centric fact $F_{A.1}$ collectively represents the fact that the user's employer assigned her a new task.

Figure 3A:
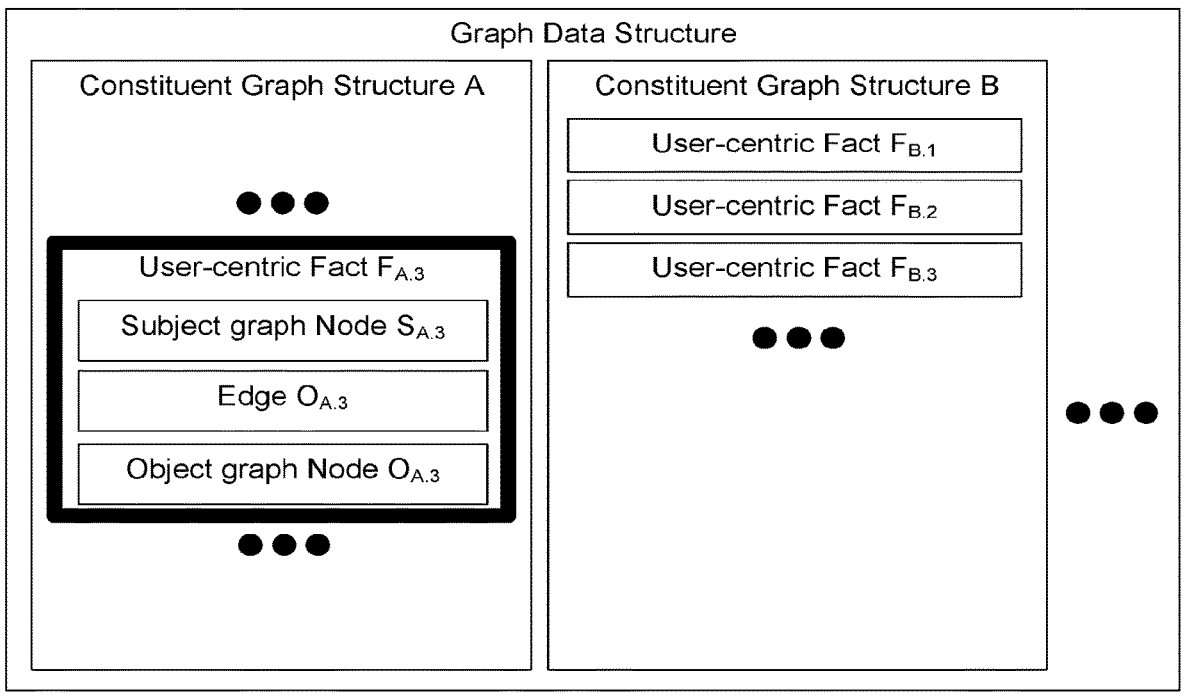
Figure 3B:
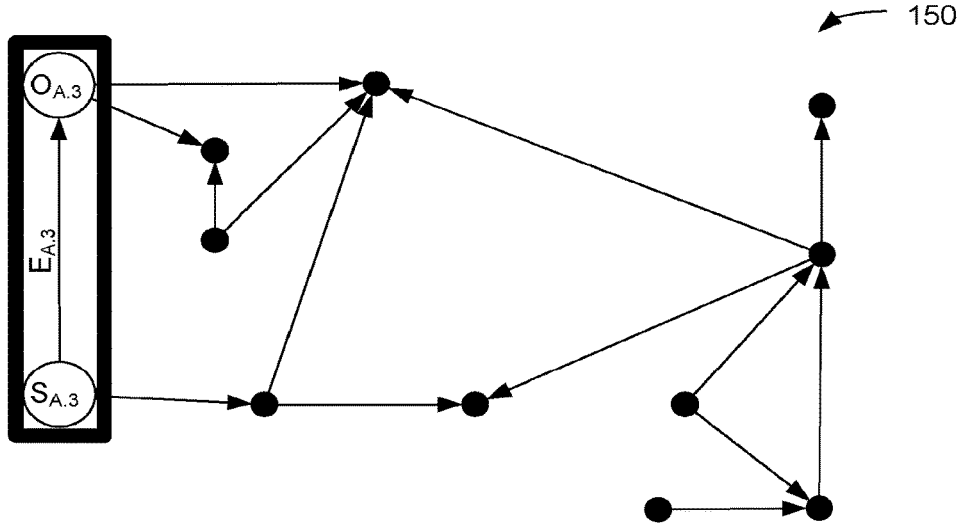

A subject graph node of a first fact may represent the same noun as an object graph node of a second, different fact. For example, FIGS. 3A-3B show the same graph data structure of FIGS. 1A-2B, focusing on a user-centric fact $F_{A.3}$. User-centric fact $F_{A.3}$ defines subject graph node $S_{A.3}$, edge $E_{A.3}$, and object graph node $O_{A.3}$. Object graph node $O_{A.3}$ may represent the same noun as subject graph node $S_{A.1}$ of FIG. 2B. Accordingly, the graph data structure may recognize object graph node $O_{A.3}$ of Fact $F_{A.3}$ and subject graph node $S_{A.1}$ of Fact $F_{A.1}$ as a single node, which is depicted in the same position in the graph 150 in FIGS. 2B and 3B. By recognizing that certain object graph nodes and subject graph nodes represent the same noun, the graph data structure may be able to represent user-centric facts as complex relationships among a plurality of different nouns, which may be visualized as paths on graph 150. For example, when a particular node is the object graph node of a first fact and the subject graph node of a second, different fact, it may be possible to derive inferences from the combination of the two facts, analogous to a logical syllogism.

Figure 4A:
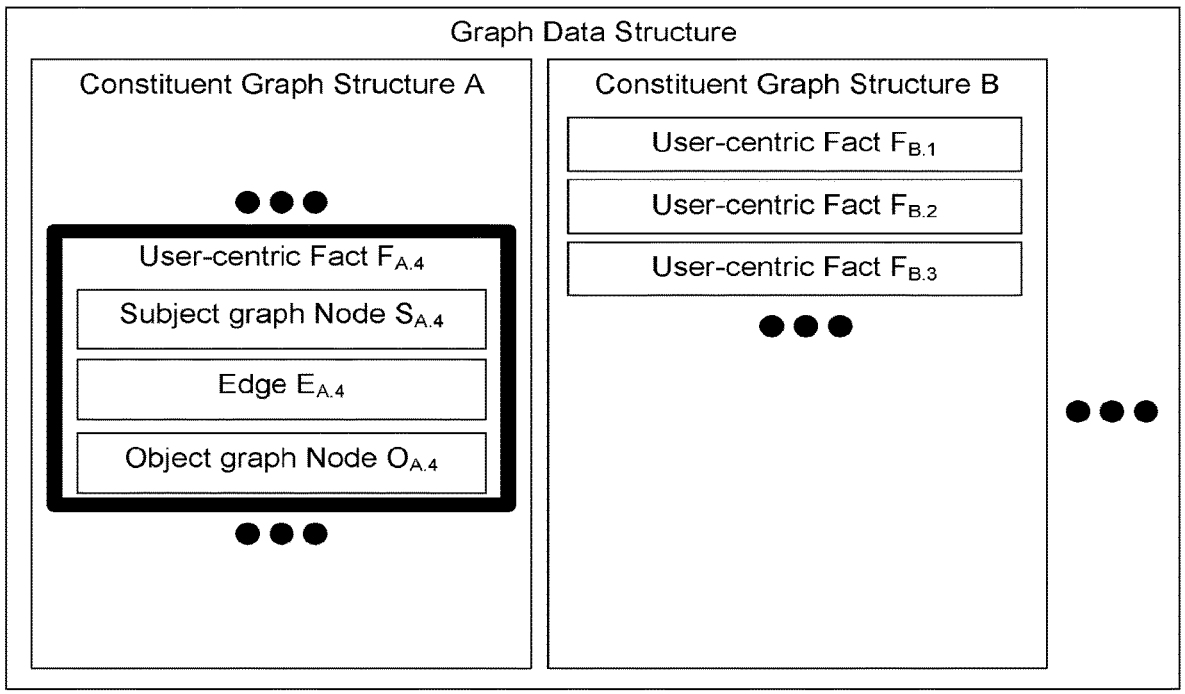
Figure 4B:
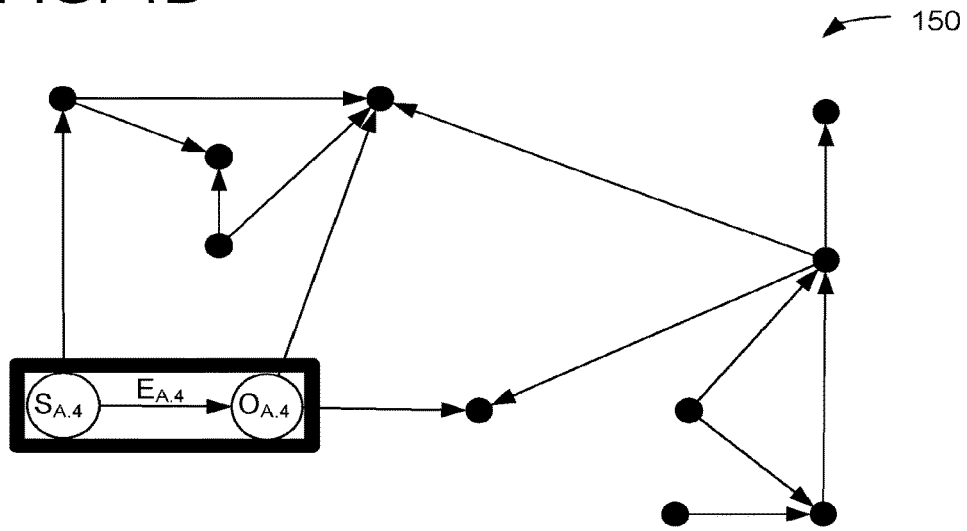

A subject graph node of a first user-centric fact may represent the same noun as a subject graph node of a second, different user-centric fact. When two different subject graph nodes represent the same noun, the graph data structure may recognize the two subject graph nodes as a single node. For example, FIGS. 4A-4B show the same graph data structure of FIGS. 1A-3B, focusing on a user-centric fact $F_{A.4}$. User-centric fact $F_{A.4}$ defines subject graph node $S_{A.4}$, edge $E_{A.4}$, and object graph node $O_{A.4}$. Subject graph node $S_{A.4}$ may represent the same noun as subject graph node $S_{A.3}$ of FIG. 3B. Accordingly, the graph data structure may recognize the two subject graph nodes as a single node, which is depicted in the same position in graph 150 in FIGS. 3B and 4B. Although subject graph nodes $S_{A.4}$ and $S_{A.3}$ may be recognized as a single node, edge $E_{A.4}$ is distinct from edge $E_{A.3}$, and likewise, object graph node $O_{A.4}$ is distinct from object graph node $O_{A.3}$. Accordingly, even though subject graph nodes $S_{A.4}$ and $S_{A.3}$ represent the same noun, the triples ($S_{A.4}$, $E_{A.4}$, $O_{A.4}$) and ($S_{A.3}$, $E_{A.3}$, $O_{A.3}$) represent two different facts.

Figure 5A:
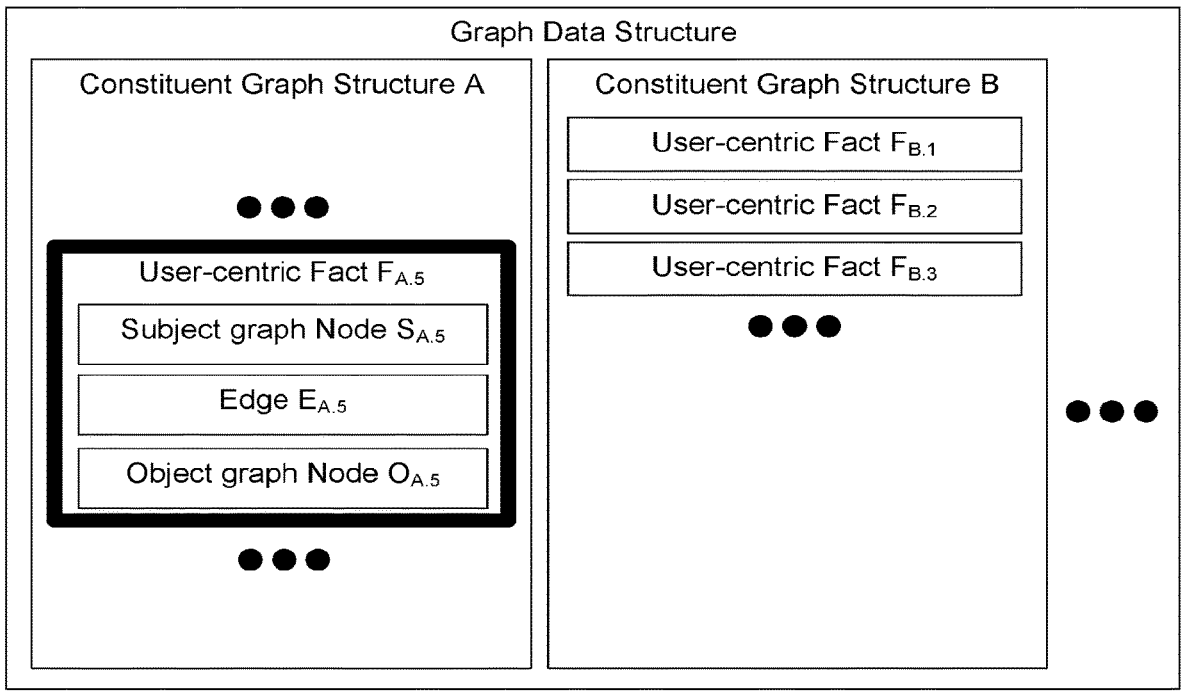
Figure 5B:
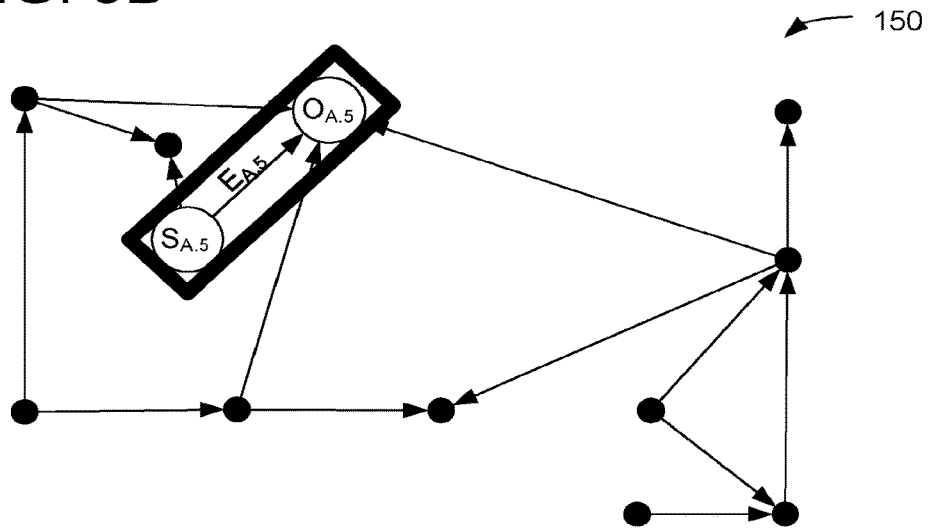

Similarly, an object graph node of a first user-centric fact may represent the same noun as an object graph node of a second, different user-centric fact. In other words, the same noun may be the object of a plurality of different user-centric facts, having different subject graph nodes and possibly having edges representing different relationship types. For example, FIGS. 5A-5B show the same graph data structure of FIGS. 1A-4B, focusing on a user-centric fact $F_{A.5}$. User-centric fact $F_{A.5}$ defines subject graph node $S_{A.5}$, edge $E_{A.5}$, and object graph node $O_{A.5}$. Object graph node $O_{A.5}$ may represent the same noun as object graph node $O_{A.1}$ of FIG. 2B. Accordingly, the graph data structure may recognize the two object graph nodes as a single node, which is depicted in the same position in the graph 150 in FIGS. 2B and 5B.

Figure 6A:
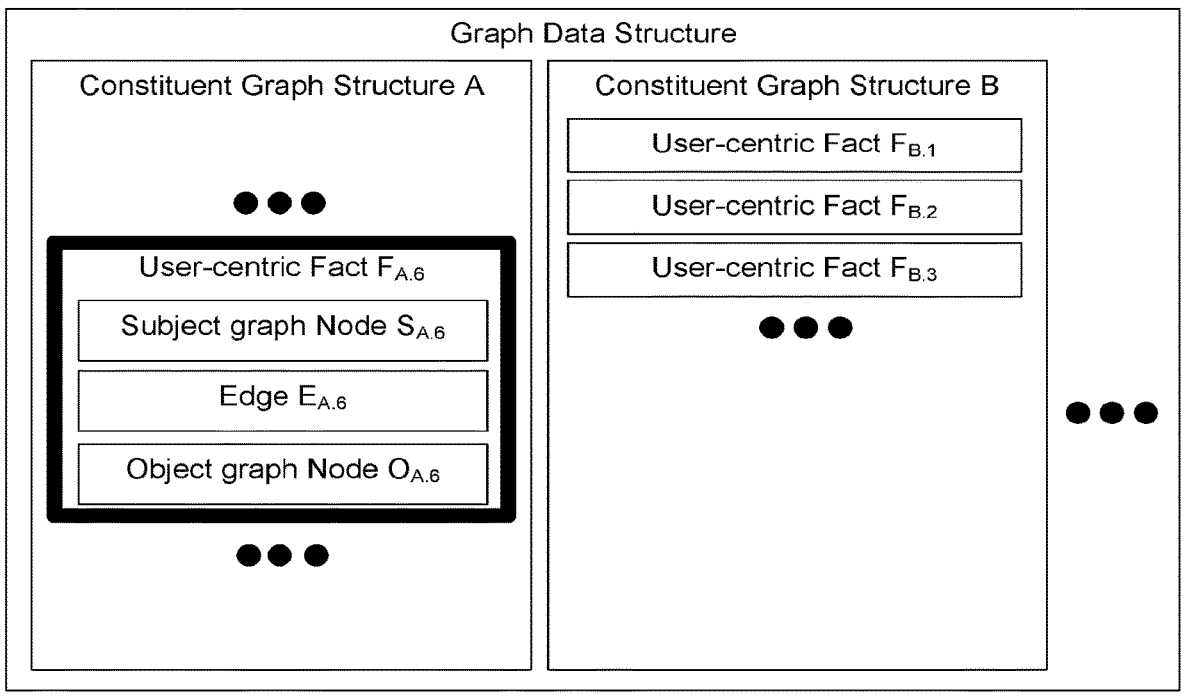
Figure 6B:
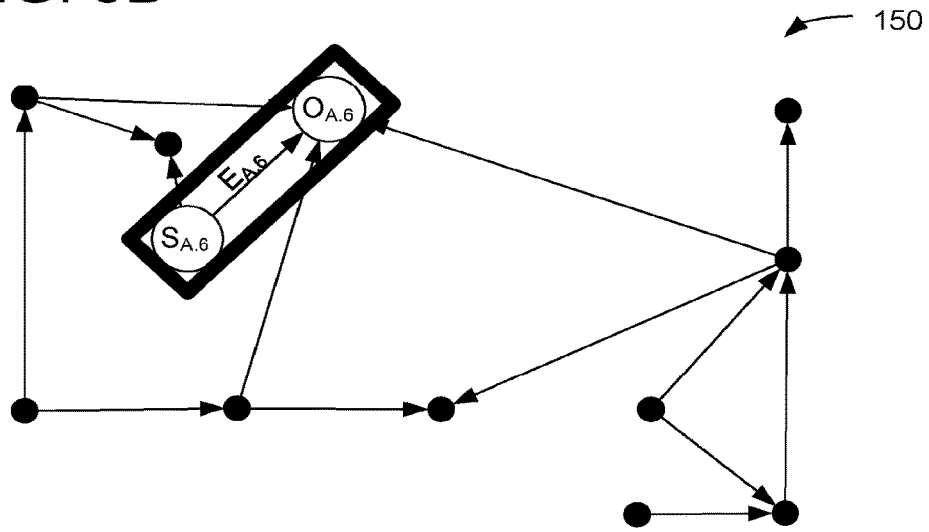

A particular pairing of a subject noun and an object noun may be involved in two or more different user-centric facts. For example, the subject noun and object noun may be represented by a first user-centric fact $F_{A.5}$ including subject graph node $S_{A.5}$, edge $E_{A.5}$, and object graph node $O_{A.5}$. Simultaneously, as depicted in FIGS. 6A-6B, a subject graph node $S_{A.6}$ may represent the same subject noun and the object graph node $O_{A.6}$ may also represent the same object noun, as indicated by the positions of $S_{A.6}$ and $O_{A.6}$ in FIG. 6B being the same as the respective positions of $S_{A.5}$ and $O_{A.5}$ in FIG. 5B. Accordingly, subject graph node $S_{A.5}$ may be connected to object graph node $O_{A.5}$ via a first edge $E_{A.5}$ while subject graph node $S_{A.6}$ is connected to object graph node $O_{A.6}$ via a second, different edge $E_{A.6}$. As with the subject graph nodes and object graph nodes, edge $E_{A.6}$ in FIG. 6B is depicted in the same position as edge $E_{A.5}$ in FIG. 5B. However, edges $E_{A.5}$ and $E_{A.6}$ are distinct edges, e.g., representing distinct relationships between the subject and object graph nodes. In an example, subject graph nodes $S_{A.5}$ and $S_{A.6}$ may correspond to a first user account (e.g., identified by an email address). In the same example, object graph nodes $O_{A.5}$ and $O_{A.6}$ may correspond to a second, different user account. In the example, edge $E_{A.5}$ may represent a "sent email to" relationship, while edge $E_{A.6}$ represents a different "scheduled meeting with" relationship. Accordingly, the graph data structure includes two or more user-centric facts having the same subject and object nouns.

In other examples, two nouns may be involved in two different user-centric facts, but with the role between subject and object swapped. In other words, a first noun is a subject noun of a first fact and a second noun is an object noun of the first fact, while the first noun is an object noun of a second fact and the second noun is a subject noun of the second fact. For example, a pair of nouns representing "Alice" and "Bob" might be involved in a first fact saying that "Alice scheduled a meeting with Bob" while also being involved in a second fact saying that "Bob scheduled a meeting with Alice." In addition to swapping a role of subject and object, the two facts using the two nouns may have different types of edges, e.g., "Alice" and "Bob" might additionally be involved in a third fact saying that "Bob sent an email to Alice."

Figure 7A:
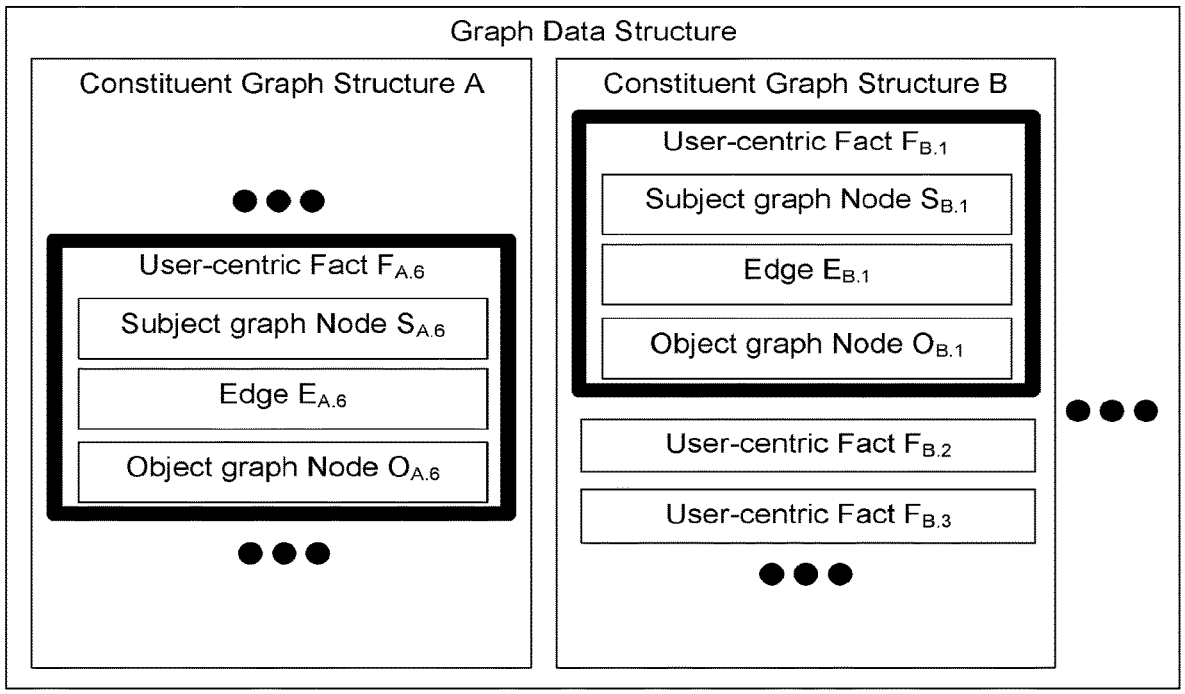
FIGS. 7A-9B show the graph data structure of FIGS. 1A and 1B, focusing on cross-references between a plurality of constituent graph structures included in the graph data structure.
Figure 7B:
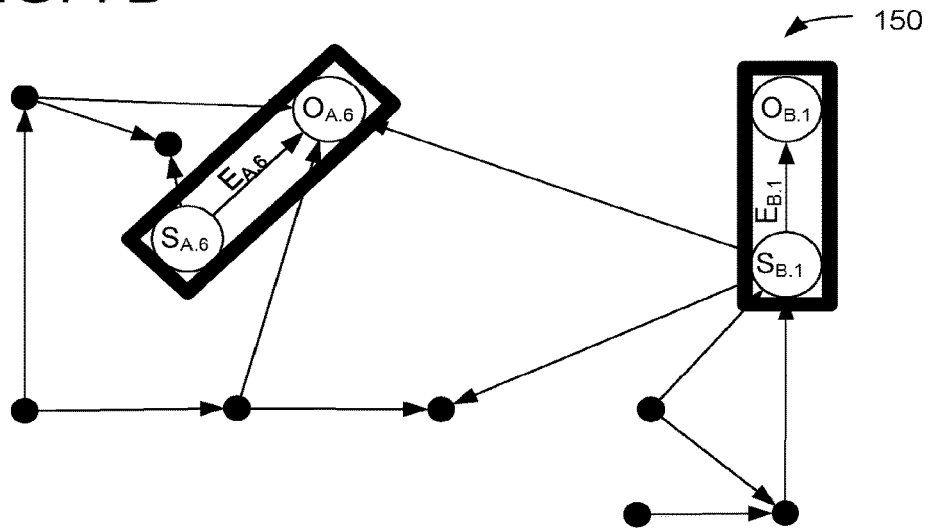

As described above and as shown in FIGS. 1A, 2A, 3A, 4A, 5A, and 6A, the graph data structure includes a plurality of application-specific constituent graph structures (e.g., corresponding to different computer services). For example, FIG. 7A-7B show the same graph data structure of FIGS. 1A-6B, focusing on two different user-centric facts $F_{A.6}$ and $F_{B.1}$. User-centric fact $F_{A.6}$ defines subject graph node $S_{A.6}$, edge $E_{A.6}$, and object graph node $O_{A.6}$ as part of constituent graph structure A. Similarly, user-centric fact $F_{B.1}$ defines subject graph node $S_{B.1}$, edge $E_{B.1}$, and object graph node $O_{B.1}$ as part of constituent graph structure B.

Figure 8A:
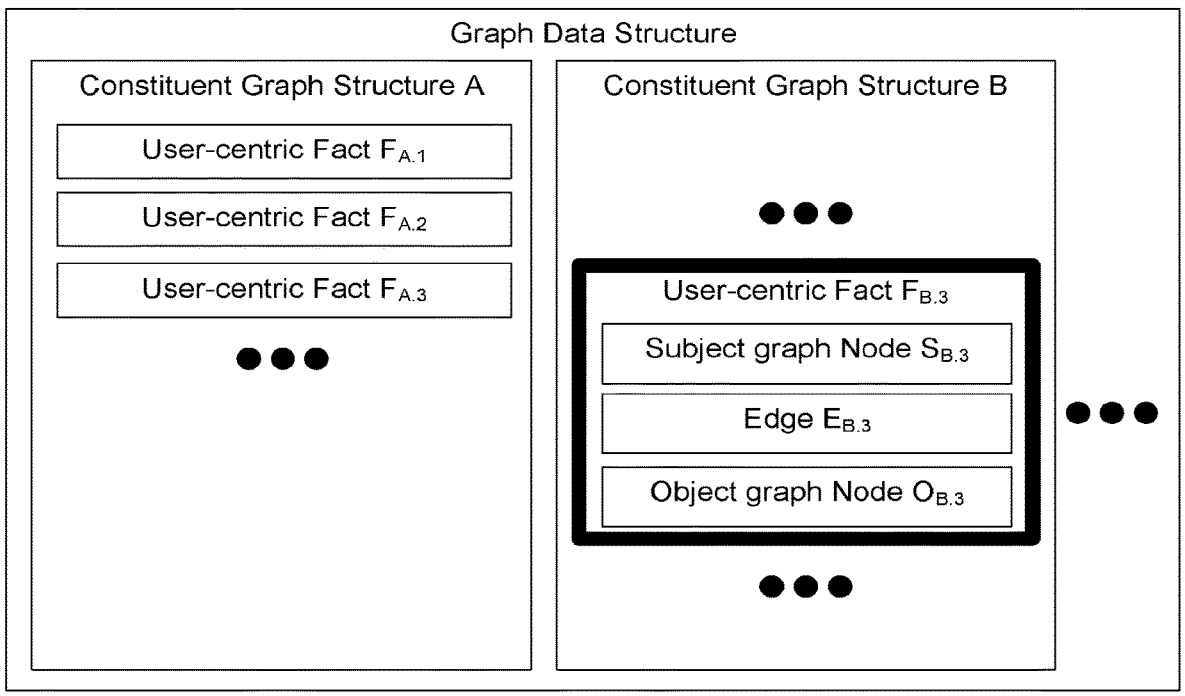
Figure 8B:
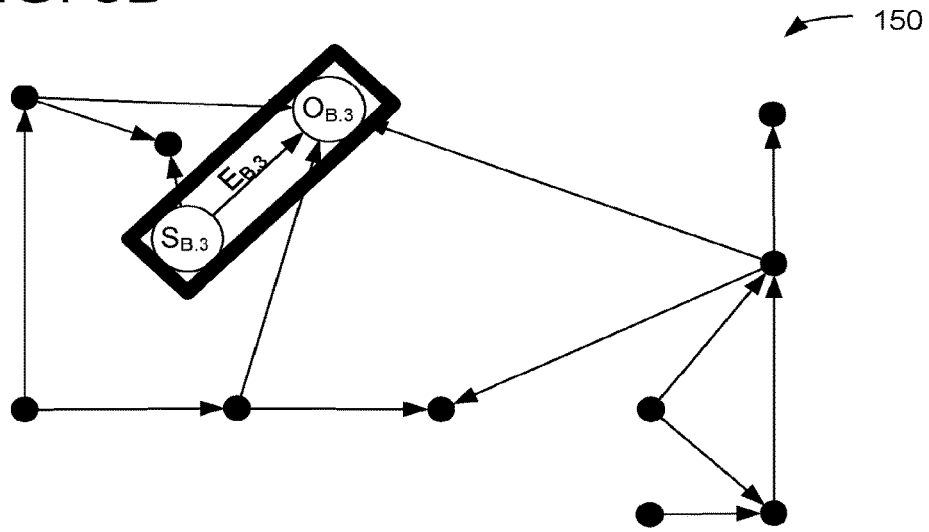

The graph data structure may recognize a noun from one constituent graph and a noun from a different constituent graph as a single node. For example, FIG. 8A-8B show the same graph data structure of FIGS. 1A-7B, focusing on a user-centric fact $F_{B.3}$. User-centric fact $F_{B.3}$ defines subject graph node $S_{B.3}$, edge $E_{B.3}$, and object graph node $O_{B.3}$. Object graph node $O_{B.3}$ may represent the same noun as object graph node $O_{A.1}$ of FIG. 2B, object graph node $O_{A.5}$ of FIG. 5B, object graph node $O_{A.5}$ of FIG. 7B, and object graph node $O_{B.3}$ of FIG. 8B. Accordingly, the graph data structure may recognize the four object graph nodes as a single node, which is depicted in the same position in the graph 150 in FIGS. 2B, 5B, 7B, and 8B. Notably, object graph node $O_{B.3}$ is in Constituent Graph Structure B, while object graph nodes $O_{A.1}$, $O_{A.5}$, and $O_{A.5}$ are in Constituent Graph Structure A. Such recognition that two or more different nodes correspond to the same noun may be referred to herein as a "node cross-reference" between the two nodes. A subject graph node or object graph node representing a particular noun may store node cross-references to other nodes of the same constituent graph structure or any other constituent graph structure.

Figure 9A:
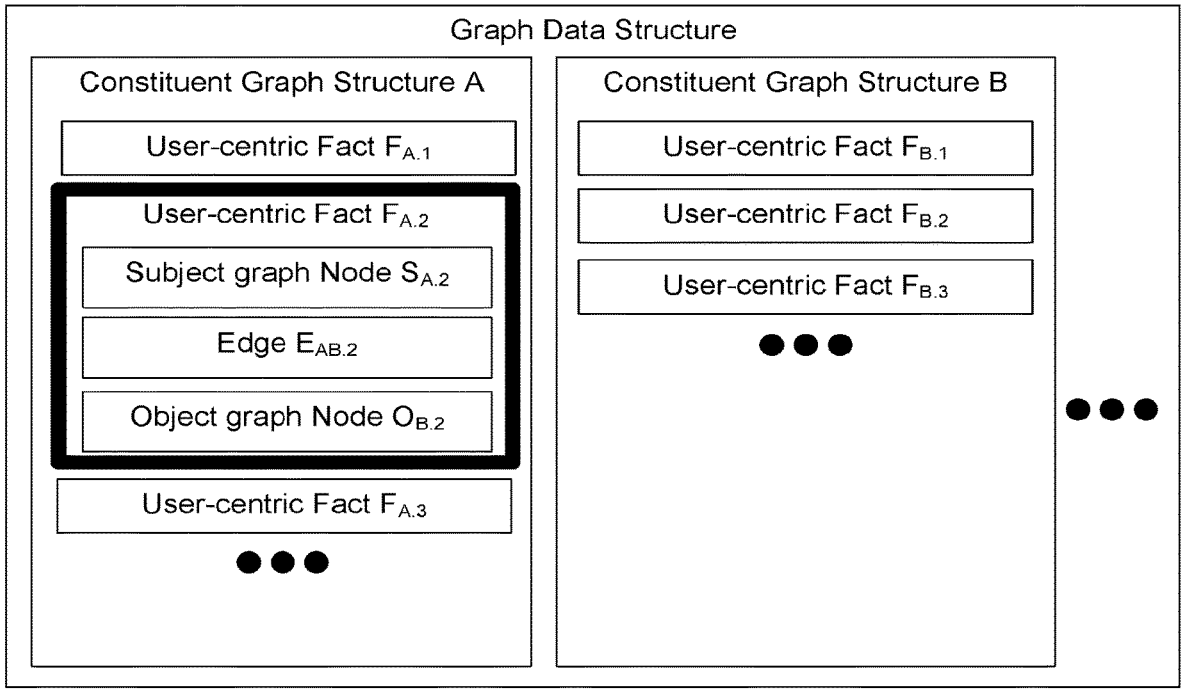
Figure 9B:
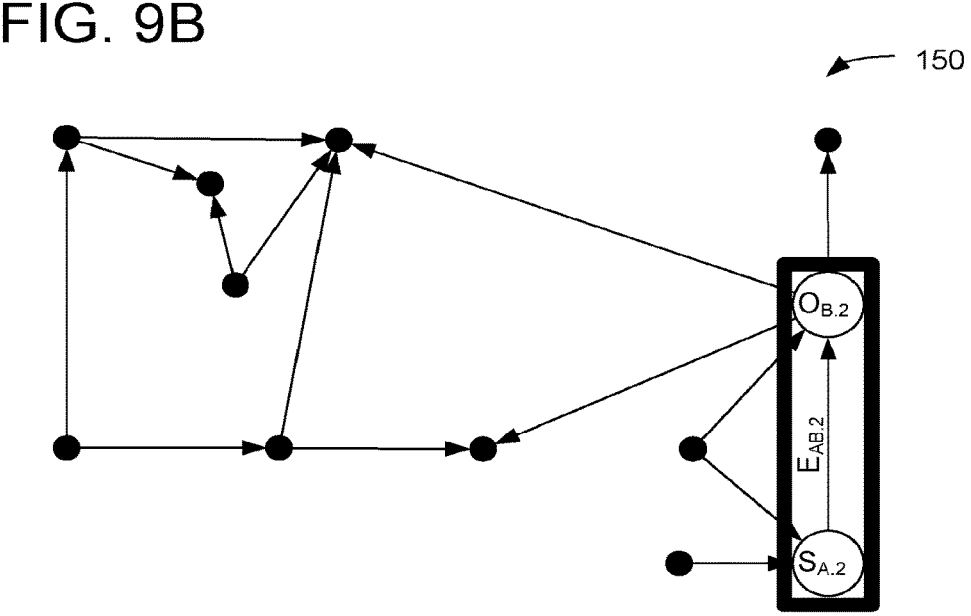

Similarly, a user-centric fact in a first constituent graph structure may define a subject graph node in the first constituent graph structure, along with an edge pointing to an object graph node in a second, different constituent graph structure (herein referred to as an "cross-reference edge"). For example, FIG. 9A-9B show the same graph data structure of FIGS. 1A-8B, focusing on a user-centric fact $F_{A.2}$. User-centric fact $F_{A.2}$ includes a subject graph node $S_{A.2}$ and an edge $E_{AB.2}$. However, edge $E_{AB.2}$ points to an object graph node $O_{B.2}$ instead of pointing to a different object graph node in constituent graph structure A. Edge $E_{AB.2}$ may indicate the connection between the constituent graphs in any suitable manner, for example, by storing a constituent graph identifier indicating a connection to an object graph node in constituent graph B, and an object graph node identifier indicating the particular object graph node in constituent graph B.

Node cross-references and cross-reference edges connect the plurality of constituent graph structures. For example, node cross-references and cross-reference edges may be traversed in the same way as edges, allowing a traversal of the graph data structure to traverse a path spanning across multiple constituent graph structures. In other words, graph data structure 100 facilitates a holistic artificial intelligence knowledge base that includes facts from different computer services and/or facts spanning across different computer services. Node cross-references and cross-reference edges may be collectively referred to herein as cross-references. Similarly, when a node is involved in cross-references within a plurality of constituent graph structures, the node may be referred to as cross-referenced across the constituent graph structures.

Furthermore, in addition to connecting two different constituent graph structures via cross-references, a constituent graph structure may include one or more user-centric facts involving a subject graph node in the constituent graph structure and an object graph node in an external knowledge base (e.g., based on the Internet, a social network, or a networked, enterprise software application). As with cross-reference edges, an outgoing edge connected to the subject graph node may indicate a connection to an external object graph node in any suitable manner, e.g., by storing a pair of identifiers indicating the external graph and the object graph node within the external graph. In some cases, the external graph may not store any user-centric data, e.g., when the external graph is a global knowledge base derived from published knowledge on the Internet.

By including cross-references between constituent graph structures, facts about a particular noun (e.g., event or entity) may be distributed across the plurality of constituent graph structures, while still supporting centralized reasoning about the relationship between user-centric facts in different constituent graph structures and in external databases (e.g., by traversing the plurality of constituent graph structures via the cross-references and cross-reference edges).

Each user-centric fact may be stored in a predictable, shared data format, which stores user-centric facts including application-specific facts associated with a computer service without requiring a change to the format of application-specific data the computer service. Such a predictable, shared data format is herein referred to as an "application-agnostic data format." The application-agnostic data format may store information needed to query the user-centric AI knowledge base, while avoiding the redundant storage of application-specific data. The graph data structure may be implemented with a complementary application programming interface (API) allowing read and write access to the graph data structure. The API may constrain access to the graph data structure so as to ensure that all data written to the graph data structure is in the application-agnostic data format. At the same time, the API may provide a mechanism that any computer service may use to add new user-centric facts to the graph data structure in the application-agnostic data format, thereby ensuring that all data stored within the graph data structure is predictably useable by other computer services using the API. In addition to providing read/write access to user-centric facts stored in the graph data structure, the API may provide data processing operations that include both reads and writes, e.g., query operations and caching of query results.

Figure 10A:
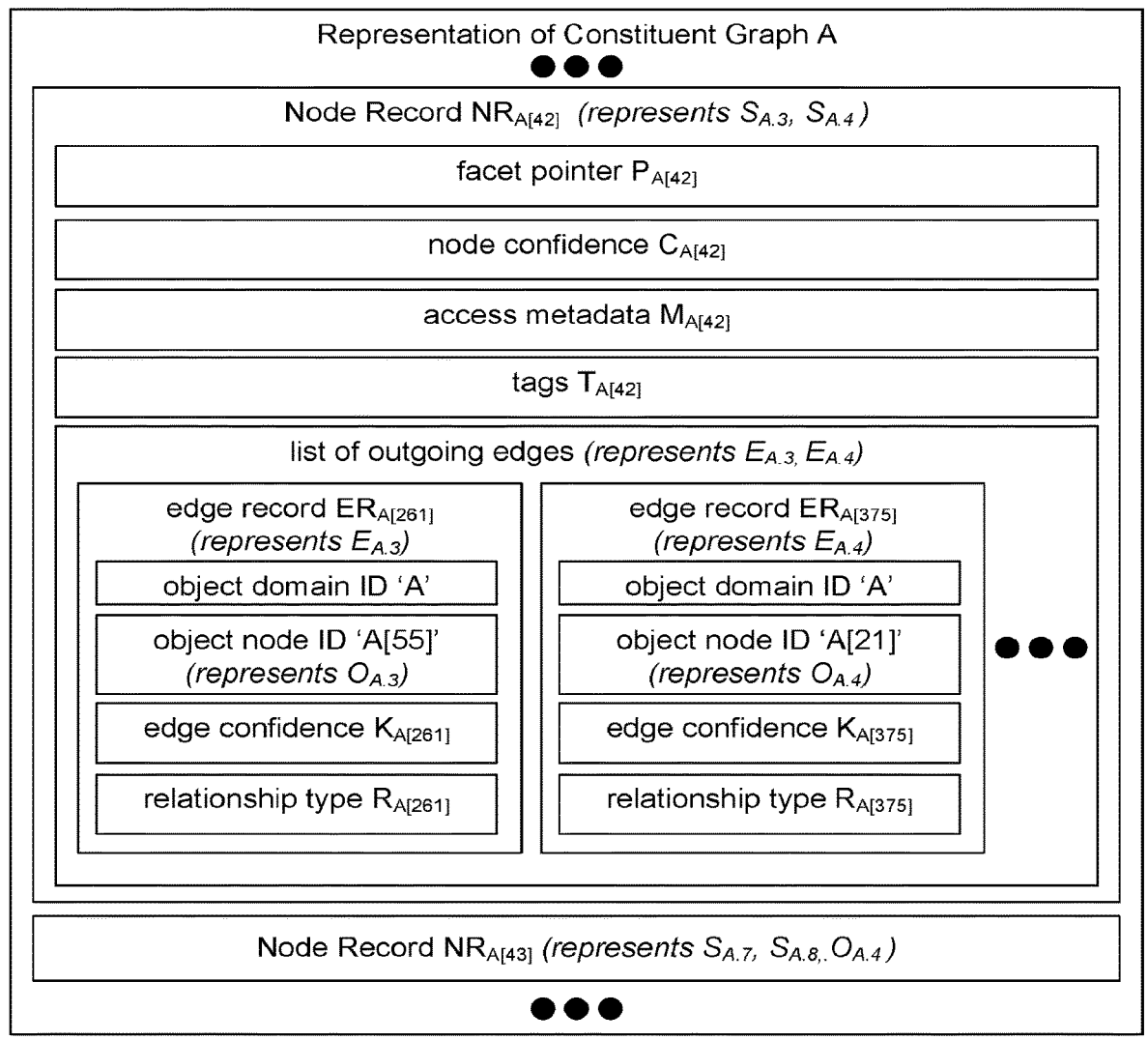
FIGS. 10A-12B show an exemplary implementation of a constituent graph structure of the graph data structure of FIGS. 1A and 1B.

A graph data structure including user-centric facts related to a plurality of different computer services, such as graph data structure 100 of FIG. 1A, may be variously implemented without departing from the spirit of this disclosure. FIG. 10A schematically shows one such nonlimiting implementation of a node-centric data structure 200 that includes a node record for each noun. Each node record represents one or more subject and/or object graph nodes associated with that noun. When a node record represents a subject graph node, the node record additionally represents outgoing edges connecting the subject graph node to one or more object graph nodes. For example, FIG. 10A shows two node records, node record $NR_{A[42]}$ and node record $NR_{A[43]}$ of the plurality of node records that would be required to fully represent all nodes of data structure 100 of FIGS. 1A-9B. The more generalized graph data structure 100 is described above to broadly introduce features of a user-centric, multi-service AI knowledge base. In practice, a more efficient data storage approach, such as node-centric data structure 200 may be used to implement the generalized features introduced above.

The node-centric data structure 200 stores each node of a constituent graph structure at a node record storage location defined by a consistent node record identifier associated with the node. The node record identifier may be a numeric and/or textual identifier, a reference to a computer storage location (e.g., an address in computer memory or a file name on a computer disk), or any other suitable identifier (e.g., a uniform resource locator (URL)). For example, node record $NR_{A[42]}$ may be identifiable by the node record identifier 'A[42]' including a node domain identifier 'A' identifying the node record as being part of the constituent graph structure A and including an additional numeric identifier 42. Accordingly, the graph data structure may store node record $NR_{A[42]}$ at a node record storage location defined by the identifier 'A[42].' For example, the graph data structure may store node record $NR_{A[42]}$ in row #42 of a database table associated with constituent graph structure A. It should be noted that a bracket nomenclature, e.g., A[42] is illustrative and is used to emphasize that while node-centric data structure 200 ultimately defines the same nodes/graph as the more generalized graph data structure 100, the particular implementation of node-data structure 200 is distinct. However, the graph data structures described herein may be implemented with any suitable nomenclature.

In the example of FIG. 10A, node record $NR_{A[42]}$ represents subject graph nodes $S_{A.3}$ and $S_{A.4}$ of the more generalized graph data structure 100, and node record $NR_{A[43]}$ represents subject graph nodes $S_{A.7}$ and $S_{A.8}$ and object graph node $O_{A.4}$ of the more generalized graph data structure 100. Accordingly, in FIG. 10B, node record $NR_{A[42]}$ is depicted in the same position in the graph as subject graph node $S_{A.3}$ and $S_{A.4}$ of FIGS. 3B and 4B, respectively. Returning to FIG. 10A, node record $NR_{A[42]}$ is expanded to show the representation of subject graph nodes $S_{A.3}$ and $S_{A.4}$ in the application-agnostic data format. In an example, a user-centric fact stored in the graph data structure is an application-specific fact. In addition to the application-specific fact, the user-centric fact may include one or more enrichments, where an enrichment is an additional datum that includes an application-agnostic fact associated with the application-specific fact.

The application-agnostic data format for user-centric facts permits efficient storage of application-specific facts, in addition to the application-agnostic representation of the connections in the graph data structure. For example, subject graph node $S_{A.3}$ may represent a subject of an application-specific fact, e.g., the fact that a new meeting was scheduled. Accordingly, the graph data structure stores for the application-specific fact a facet pointer that indicates auxiliary application-specific data associated with the application-specific fact. In the example, facet pointer $P_{A[42]}$ is an identifier (e.g., a numeric identifier) indicating a storage location of the auxiliary application-specific data associated with $S_{A.3}$, e.g., a storage location of a calendar entry representing details of the meeting. Facet pointer $P_{A[42]}$ may be associated with a particular type of data (e.g., calendar data) based on its inclusion in application-specific graph structure A since application-specific graph structure A is associated with schedule planning software. In other examples, a facet pointer may include additional identifying information specifying a type of the auxiliary application-specific data, so that facet pointers may be used to represent different kinds of auxiliary application-specific data (e.g., multiple file types useable by a word processing application). The graph data structure may be used to find auxiliary application-specific data via the facet pointers, while avoiding redundantly storing the auxiliary application-specific data within the graph data structure.

In addition to the facet pointer stored in a subject graph node, an application-specific fact is further represented by the edges connecting the subject graph node to one or more object graph nodes. Although a single subject graph node may be included in more than one user-centric fact, the graph data structure 200 nevertheless efficiently stores only a single node record for the subject graph node. This node record includes the list of all of the node's outgoing edges, which may reduce a storage space requirement compared to storing a copy of the subject graph node for each user-centric fact in which it occurs. The list of outgoing edges may be empty for some nodes, e.g., for a noun that is only an object graph node. The list of outgoing edges of a subject graph node includes one or more edge records defining one or more edges. The one or more edges may be stored in edge records, e.g., $ER_{A[261]}$ and $ER_{A[375]}$. Although FIG. 10A shows a node record with two outgoing edges, a node record may include any number of edges to suitably represent relationships to other nodes of the graph data structure, e.g., zero, one, or three or more edges.

Figure 10B:
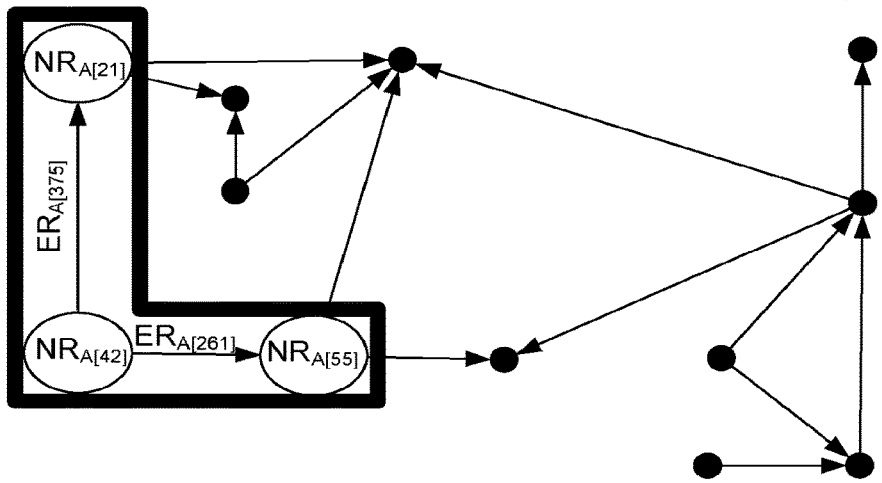

An edge from a subject graph node to an object graph node specifies an object graph node record identifier associated with the object graph node, e.g., object graph node ID 'A[55]' of node record $NR_{A[42]}$. The object graph node record identifier is a consistent node record identifier indicating a storage location of a node record defining the object graph node, e.g., $NR_{A[55]}$. An edge may further specify an object domain identifier of a constituent graph structure storing the object graph node, e.g., object domain ID 'A' of node record $NR_{A[42]}$ indicating that $NR_{A[55]}$ is stored in constituent graph structure A. Accordingly, FIG. 10B shows the node record $NR_{A[42]}$ connected via edges represented by records $ER_{A[261]}$ and $ER_{A[375]}$, to nodes represented by node records $NR_{A[55]}$ and $NR_{A[21]}$. Returning to FIG. 10A, an edge from a subject graph node to an object graph node (e.g., as represented in an edge record) may further specify a relationship type between the subject graph node and the object graph node. For example, edge record $ER_{A[261]}$ defines a relationship type $R_{A[261]}$ which may indicate a "scheduled meeting" relationship, while edge record $ER_{A[375]}$ defines a relationship type $R_{A[375]}$ which may indicate a "made commitment" relationship.

In addition to representing the application-specific fact via the facet pointer and the list of outgoing edges, the subject graph node may represent the one or more enrichments of the application-specific fact. In an example, the one or more enrichments include a node confidence value, e.g., node confidence $C_{A[42]}$ of node record $NR_{A[42]}$. Node confidence $C_{A[42]}$ may indicate a relevance of node record $C_{A[42]}$ (and the subject graph nodes it represents) to the user. For example, the confidence value may be determined by a machine learning model trained to recognize relevance to the user, by learning to distinguish labelled samples of relevant data from labelled samples of irrelevant data. For example, training the machine learning model may include supervised training with user-labelled samples (e.g., derived from direct user feedback during application with an application), and/or unsupervised training. In the example of FIG. 10A, node confidence $C_{A[42]}$ of node record $NR_{A[42]}$ may be a higher value than node confidence $C_{A[55]}$ of node record $NR_{A[55]}$, indicating that node record $NR_{A[42]}$ is believed to be more relevant to the user than node record $NR_{A[55]}$.

In the example shown in FIG. 10A, the one or more enrichments further include an edge confidence value associated with each edge, e.g., edge confidence $K_{A[261]}$ of edge record $ER_{A[261]}$. As with node confidence values, an edge confidence value may indicate a relevance of a particular edge (e.g., $ER_{A[261]}$) to the user. Different edges between a pair of nodes may have different confidence values. For example, edge record $ER_{A[261]}$ indicating a "scheduled meeting" relationship may have a lower edge confidence $K_{A[261]}$ than edge confidence $K_{A[375]}$ of edge record $ER_{A[375]}$ indicating a "made commitment," e.g., if the scheduled meeting is believed to be more relevant to the user than the commitment.

In addition to a node confidence value and edge confidence value, the one or more enrichments of the application-specific fact may include other application-agnostic and/or application-specific data. For example, node record $NR_{A[42]}$ includes access metadata $M_{A[42]}$ indicating information associated with accessing node record $NR_{A[42]}$ and associated application-specific data (e.g., data indicated by facet pointer $P_{A[42]}$). Access metadata $M_{A[42]}$ may include a timestamp indicating a time and date of a most recent access, a delta value indicating a change caused by a most recent access, or any other suitable metadata.

The graph data structure may additionally store, for a user-centric fact, one or more tags defining auxiliary data associated with the user-centric fact. For example, node record $NR_{A[42]}$ further includes tags $T_{A[42]}$ which may include any other suitable auxiliary data associated with the node. For example, when node $NR_{A[42]}$ represents a person (e.g., associated with a contact book entry), tags $T_{A[42]}$ may include a nickname of the person and an alternate email address of the person.

User-centric facts and nodes/edges of the user-centric facts may be enriched with additional semantics stored in the tags. For example, tags may be used to store one or more enrichments of a user-centric fact. A tag stored within a node record may be associated with a user-centric fact in which the node record represents a subject graph node or in which the node record represents an object graph node. Alternately or additionally, a tag stored within a node record may be associated with the node record itself (e.g., associated with a subject graph node represented by the node record and/or with an object graph node represented by the node record), or with one or more edges connected to the node record. In other examples, tags may be used to store metadata of a user-centric fact (e.g., instead of or in addition to the access metadata of the user-centric fact). For example, when a user-centric fact is associated with a timestamp, the timestamp may optionally be stored among the tags of the user-centric fact.

In some examples, the one or more tags are searchable tags and the graph data structure is configured to allow searching for a user-centric fact by searching among the searchable tags (e.g., searching for a tag storing a search string, or searching for a tag storing a particular type of data).

Figure 11A:
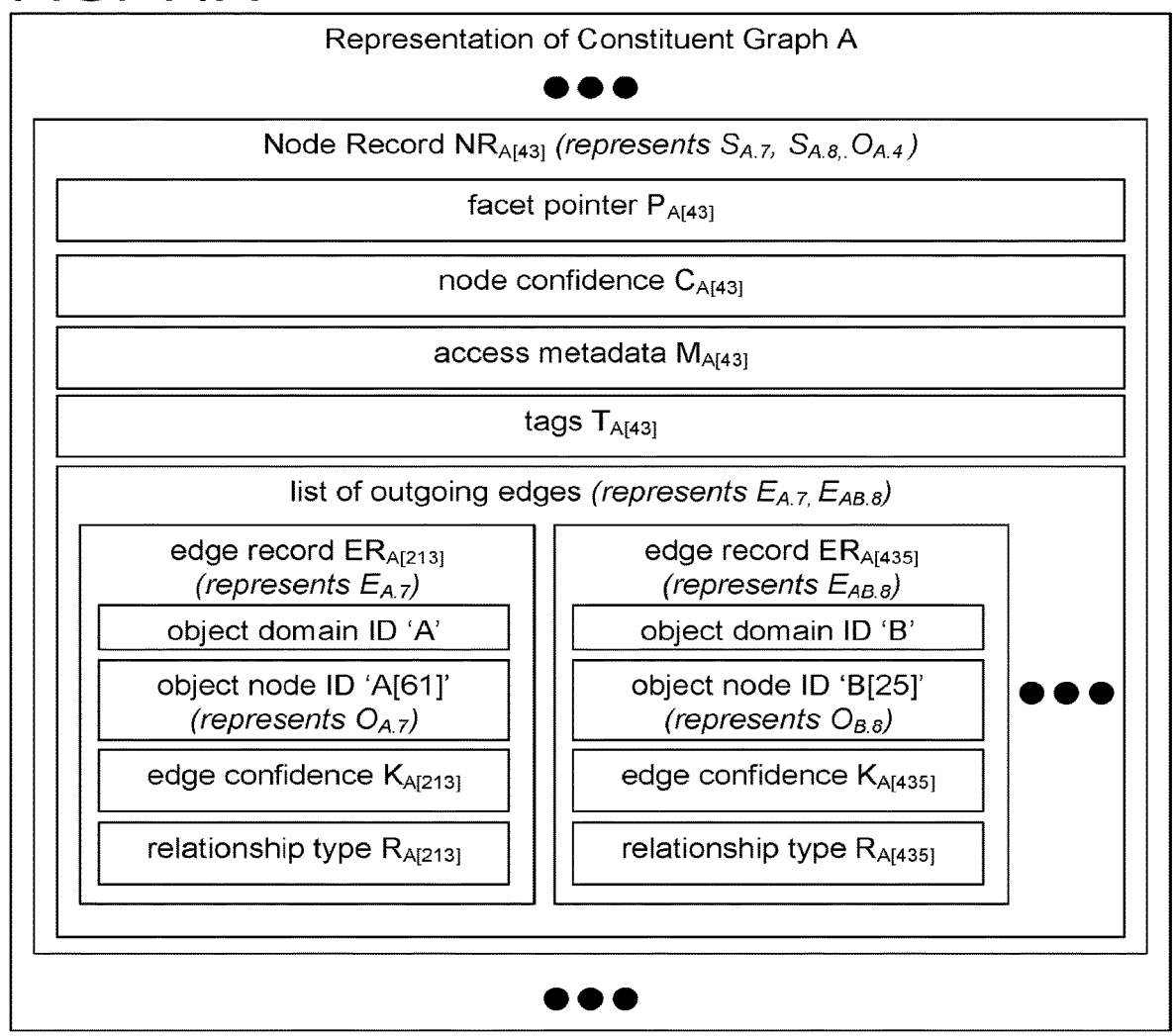
Figure 11B:
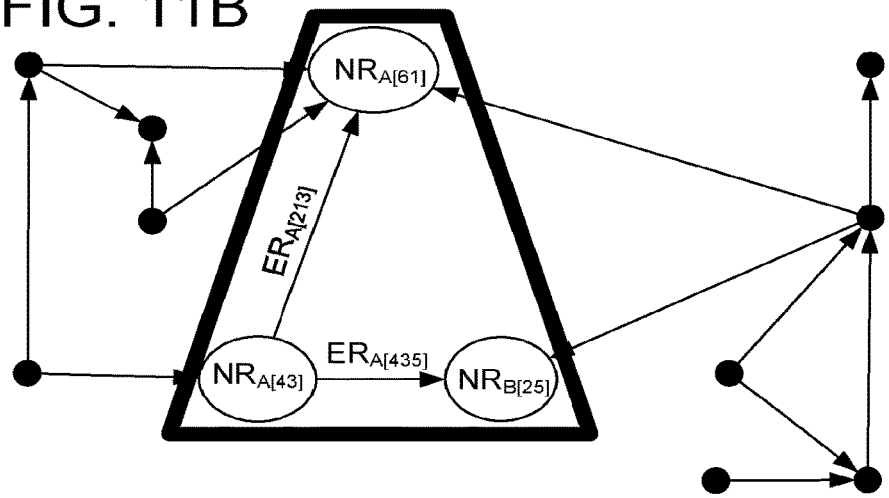

Graph data structures may be represented as a plurality of application-specific constituent graph structures, wherein nodes of the constituent graph structures are cross-referenced across constituent graph structures (e.g., by cross-reference edges and node cross-references, as described above with reference to FIGS. 8A-9B). FIG. 11A shows another exemplary view of the same node-centric data structure 200 shown in FIG. 10A, focusing on a node $NR_{A[43]}$ representing subject graph nodes $S_{A.7}$, $S_{A.8}$, and object graph node $O_{A.4}$. The list of outgoing edges from $NR_{A[43]}$ includes an edge record $ER_{A[213]}$ indicating an object graph node ID 'A[61]', representing a node in the same constituent graph structure A. The list of outgoing edges from $NR_{A[43]}$ further includes an edge record $ER_{A[435]}$ indicating an object domain ID 'B' and an object graph node ID 'B[61]', representing a node in the constituent graph structure B. Edge record $ER_{A[435]}$ is therefore a cross-reference edge. FIG. 11B graphically depicts the same graph data structure as FIGS. 1A-9B, including $NR_{A[43]}$ and its outgoing edges to $NR_{A[61]}$ and $NR_{B[25]}$.

Figure 12A:
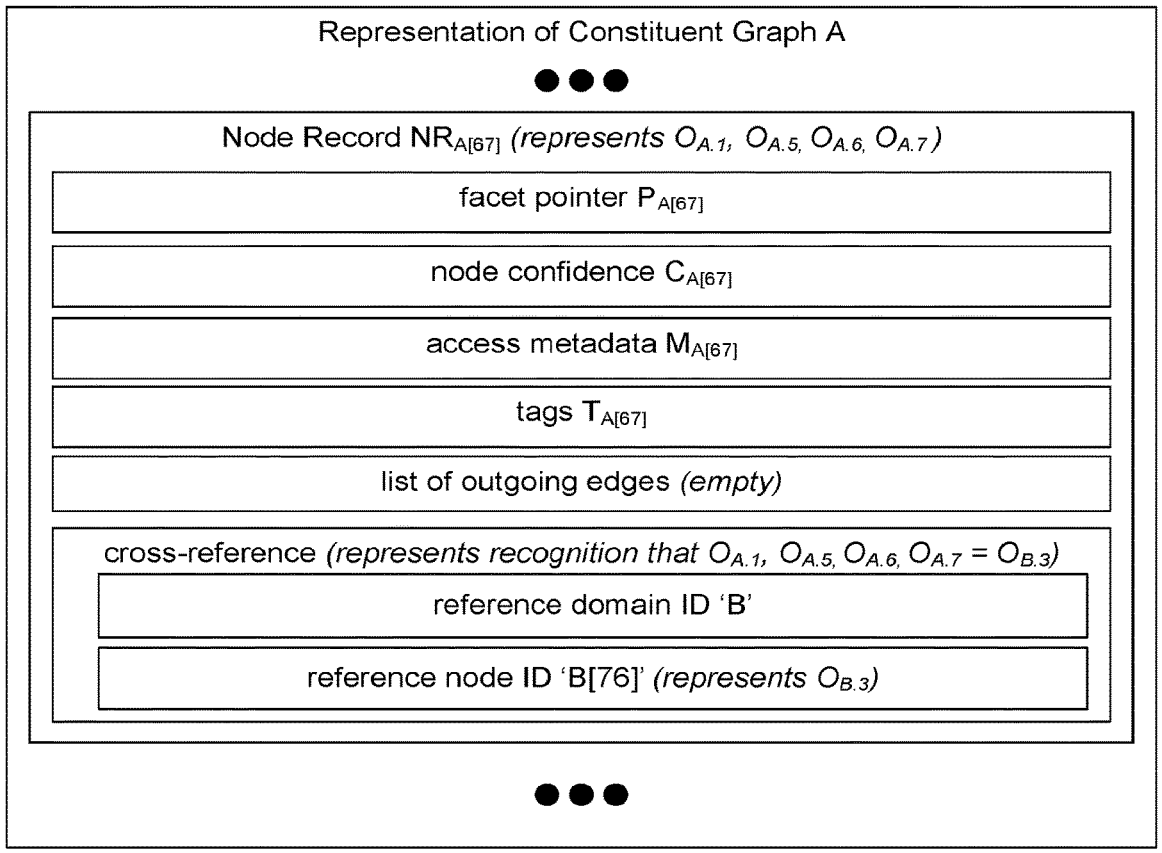
Figure 12B:
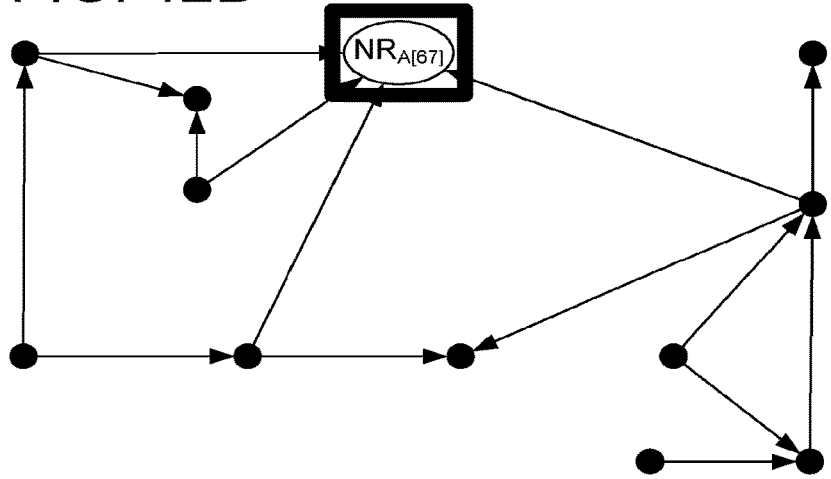

FIG. 12A shows another exemplary view of the node-centric data structure 200 shown in FIG. 10A, focusing on a node $NR_{A[67]}$ representing object graph nodes $O_{A.1}$, $O_{A.5}$, $O_{A.6}$, and $O_{A.7}$. Note that the list of outgoing edges from node $NR_{A[67]}$ is empty, because $NR_{A[67]}$ represents only object graph nodes, which have only incoming edges. However, $NR_{A[67]}$ further includes a cross-reference representing the graph data structure's recognition that $O_{A.1}$, $O_{A.5}$, $O_{A.6}$, and $O_{A.7}$ represent the same node as $O_{B.3}$ of constituent graph structure B. Accordingly, the cross-reference specifies a reference domain ID 'B' indicating constituent graph structure B, and a reference node ID 'B[76]' indicating that the cross-reference node $O_{B.3}$ is stored in node record $NR_{B[76]}$ of another node-centric data structure representing constituent graph structure B. FIG. 12B graphically depicts the same graph data structure shown in FIGS. 1A-9B. Note that node record $NR_{A[67]}$ is depicted at the same position as object graph nodes $O_{A.5}$ and $O_{A.6}$ of FIGS. 5B and 6B, which is also the same position as object graph node $O_{A.5}$ of FIG. 8B.

The node-centric data structure 200 is application-agnostic, in that it may be used to track facts from two or more potentially unrelated computer services, which may have different native data formats. The node-centric data structure 200 may store application-specific facts of any computer service by storing a facet pointer, enabling user-centric facts to include application-specific facts even when the application-specific facts may be stored in an application-specific format. Moreover, the node-centric data structure 200 enables the representation of user-centric facts that are defined in a context of two or more computer services, by storing cross-references in the form of domain identifiers (e.g., object domain identifiers in lists of outgoing edges of each subject graph node, or reference domain identifiers in a representation of a node cross-reference) and node identifiers (e.g., object graph node identifiers and reference node identifiers). Furthermore, the node-centric data structure 200 is user-centric, as a different node-centric data structure 200 may be defined for each user. The node-centric data structure 200 may be suitable to store user-centric facts in contexts where a plurality of different users interact with a shared computer service (e.g., a web browser). Because the node-centric data structure 200 stores application-specific facts via the facet pointer and represents relationships to facts in other data structures via cross-references, it may be able to store user-centric facts concerning a user in a user-centric graph data structure particular to the user, without requiring write access to application-specific data of the shared computer service.

Figure 13:
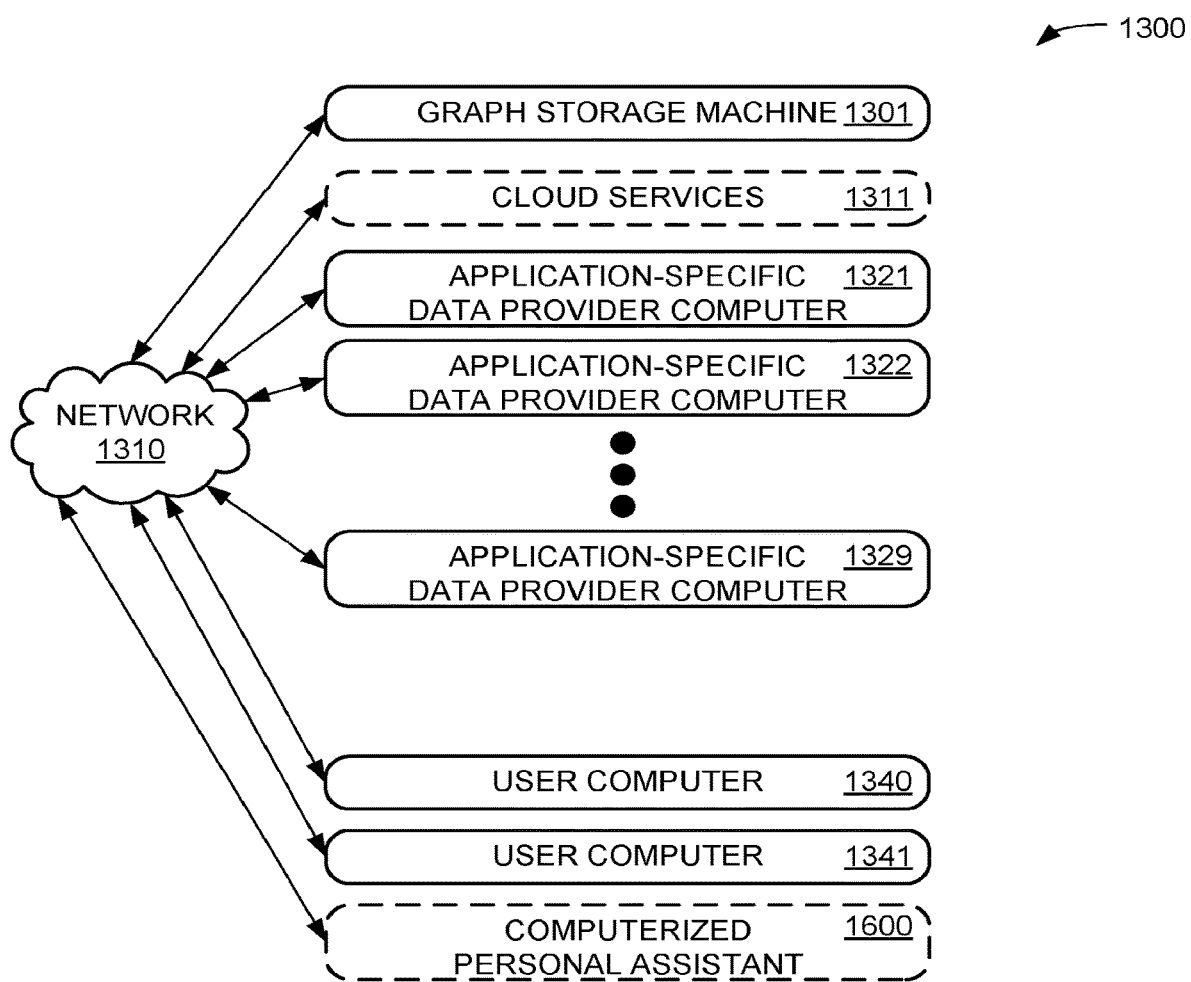
FIG. 13 shows an exemplary computing environment for a user-centric artificial intelligence knowledge base.

FIG. 13 shows an exemplary computing environment 1300 for maintaining a user-centric AI knowledge base. Computing environment 1300 includes a graph storage machine 1301 communicatively coupled, via a network 1310, to a plurality of application-specific data provider computers (e.g., application specific data provider computers 1321, 1322 and 1329, etc.). Graph storage machine 1301 and the plurality of application-specific data provider computers are further communicatively coupled, via network 1310, to one or more user computers of a user (e.g., user computer 1340 and user computer 1341). For example, user computer 1340 may be a desktop computer of the user, while user computer 1341 may be a mobile computing device of the user. Network 1310 may be any suitable computer network (e.g., the Internet).

In some examples, computing environment 1300 may additionally include a computerized personal assistant 1600 communicatively coupled to graph storage machine 1301 via network 1310. Computerized personal assistant 1600 may be implemented in any suitable manner, e.g., as an all-in-one computing device, or as a software application executable on any suitable computing device, such as a desktop computer or a mobile phone. The computerized personal assistant may be a stand-alone computer service or an assistance component of another computer service (e.g., email/calendar application, search engine, integrated development environment).

In some examples, computing environment 1300 may additionally include cloud services 1311. Cloud services 1311 may be communicatively coupled via network 1310 to other computing devices of computing environment 1300. Cloud services 1311 may include one or more computing devices configured to perform any suitable tasks. In some examples, cloud services 1311 may be utilized to offload functionality of another computing device to cloud services 1311. For example, functionality of graph storage machine 1301, application-specific data provider computer 1321, user computer 1340, and/or computerized personal assistant 1600 may be offloaded to cloud services 1311.

In an example, cloud services 1311 are configured to perform natural language processing tasks. Graph storage machine 1301 may be configured to perform a natural language processing task by offloading the task to cloud services 1311. Accordingly, graph storage machine 1301 may offload input data of the natural language processing task to cloud services 1310, and receive, from cloud services 1310, output data indicating a result of the natural language processing task. Alternately or additionally, computerized personal assistant 1600 may be configured to perform a natural language processing task with remote processing assistance of cloud services 1311. In a similar fashion, computing devices of computing environment 1300 may offload any suitable task(s) to cloud services 1311, wherein cloud services 1311 are configured to perform the offloaded task(s).

Graph storage machine 1301 may be implemented as a single machine (e.g., a computer server). Alternately, functionality of graph storage machine 1301 may be distributed across a plurality of different physical devices (e.g., by implementing graph storage machine 1301 as a virtual service provided by a computer cluster). Each application-specific data provider computer (e.g., application-specific data provider computer 1321) may be associated with one or more computer services used by the user, e.g., social network applications, email applications, schedule planner applications, office suites, internet of things appliance functions, web search applications, etc.

As the user interacts via user computer 1340 and/or user computer 1341 with one or more computer services, the application-specific data provider computers may aggregate information related to the user's interaction with the one or more computer services. In an example where the user interacts with a social network application, application-specific data provider computer 1322 may be communicatively coupled to a server providing functionality of the social network application. Accordingly, when the user interacts with the social network application, the server may provide an indication of the interaction to the application-specific data provider computer 1322. In turn, application-specific data provider computer 1322 may provide one or more user-centric facts to graph storage machine 1301. In examples, user computer 1340 may execute one or more application programs which may provide additional user-centric facts aggregated at user computer 1340 to graph storage machine 1301, causing user computer 1340 to act as an additional application-specific data provider. In examples, user computer 1340 may execute one or more application programs which may request user-centric facts from graph storage machine 1301, e.g., by sending a query. Although the above examples include the user interacting with the one or more computer services via user computer 1340, in other examples, the user may interact with the one or more computer services via user computer 1341 instead of or in addition to user computer 1340. For example, when user computer 1340 acts as an application-specific data provider by providing one or more facts to graph storage machine 1301, user computer 1341 may execute one or more application programs to request user-centric facts from graph storage machine 1301. In this manner, graph storage machine 1301 may aggregate user-centric facts from a plurality of different user computers of the user, while also allowing each of the different user computers to request and utilize the user-centric facts.

In an example, user computer 1340 may execute a computerized personal assistant configured to communicate via network 1310 with graph storage machine 1301. The computerized personal assistant may receive queries from a user via an NUI configured to receive audio and/or textual natural language queries. The computerized personal assistant may send one or more queries to graph storage machine 1301, in order to receive one or more user-centric facts output by graph storage machine 1301 responsive to the queries. Alternately or additionally, the computerized personal assistant may aggregate user-centric facts (e.g., user interests indicated in conversation via the NUI), causing user computer 1340 to act as an application-specific data provider. In some cases, the graph storage machine 1301 and an application-specific data provider may be administered by a single entity or organization, in which case the application-specific data provider may be referred to as a "first party" application-specific data provider. In other cases, graph storage machine 1301 and an application-specific data provider may be administered by different entities or organizations, in which case the application-specific data provider may be referred to as a "third party" application-specific data provider.

Figure 14:
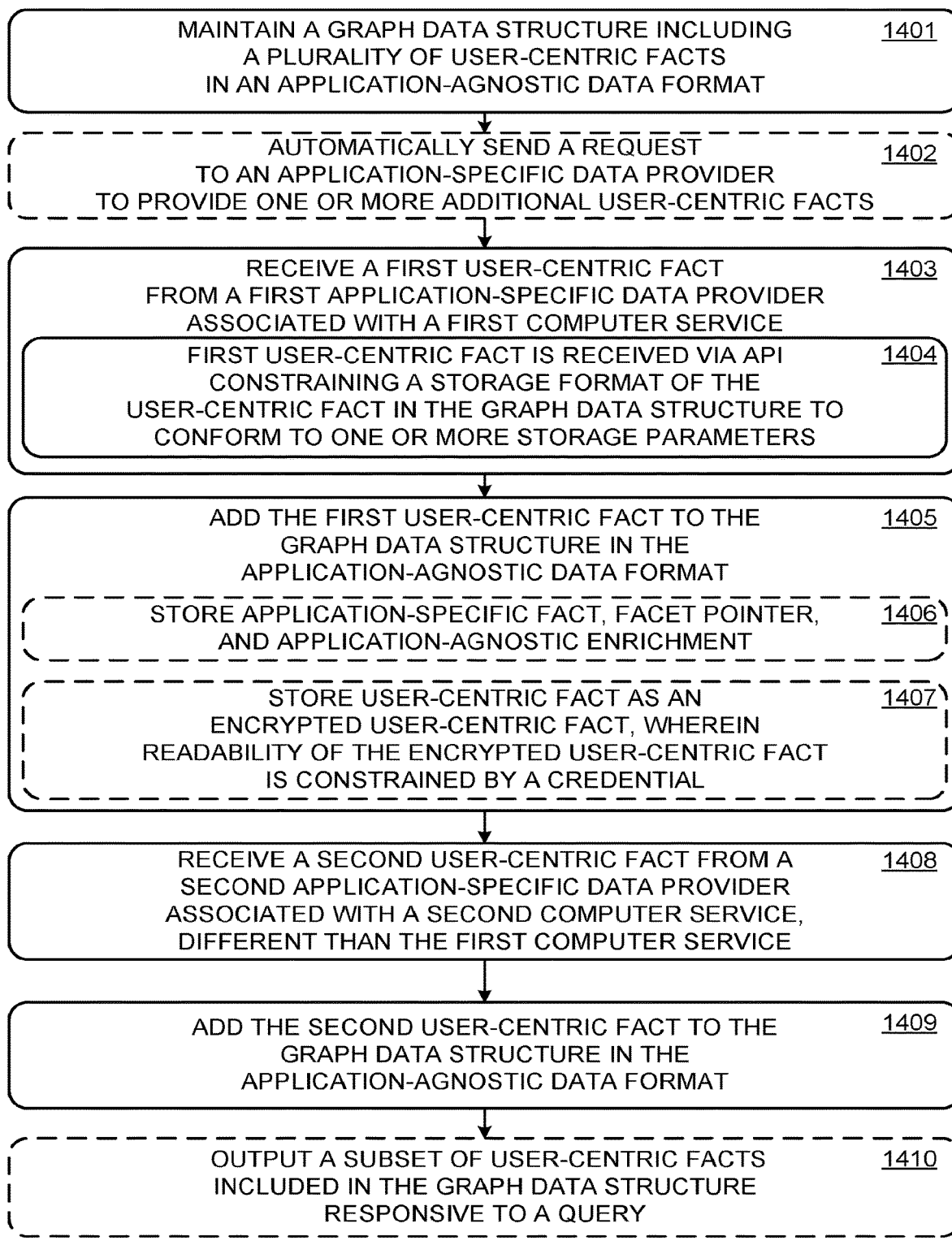
FIG. 14 shows a method of maintaining a user-centric artificial intelligence knowledge base.

FIG. 14 shows an exemplary method 1400 of maintaining a user-centric, artificial intelligence knowledge base. The user-centric AI knowledge base may be suitable for storing user-centric facts about a user interacting with a plurality of different, possibly unrelated computer services. Furthermore, the user-centric AI knowledge base may be useable to answer queries about the user-centric facts. Maintaining the user-centric AI knowledge base includes building the knowledge base by storing one or more user-centric facts, updating the user-centric AI knowledge base by adding additional facts, and updating the user-centric AI knowledge base as it is queried and used (e.g., to store cached answers to a query to enable subsequent fast answering of the query).

At 1401, method 1400 includes maintaining a graph data structure including a plurality of user-centric facts associated with a user. Each user-centric fact may have an application-agnostic data format, e.g., including a subject graph node, an object graph node, and an edge connecting the subject graph node to the object graph node. The graph data structure may be represented as a plurality of application-specific constituent graph structures, where nodes of the constituent graph structures are cross-referenced across constituent graph structures. The graph data structure may be stored using any suitable application-agnostic data format, such as the node-centric data structure 200 described above with reference to FIGS. 10A-12B.

At 1402, method 1400 optionally includes automatically sending a request to an application-specific data provider to provide user-centric facts. Sending a request to an application-specific data provider may be done in any suitable manner, e.g., over a computer network via an API of the application-specific data provider. The request may indicate that specific user-centric facts should be provided (e.g., user-centric facts from within a particular range of times and/or dates, user-centric facts which have not yet been provided by the application-specific data provider, and/or user-centric facts with a particular associated tag). Alternately, the request may indicate that all available user-centric facts should be provided. Sending a request to an application-specific data provider and receiving user-centric facts responsive to the request may be referred to herein as "pulling" data from the application-specific data provider. Additional user-centric facts may be requested according to any suitable schedule, e.g., periodically. In addition to providing additional user-centric facts responsive to a request, an application-specific data provider of the plurality of application-specific data providers may send user-centric facts in absence of a request to do so, which may be referred to herein as "pushing" user-centric facts to the user-centric AI knowledge base.

At 1403, method 1400 includes receiving a first user-centric fact from a first application-specific data provider associated with a first computer service (e.g., due to pulling data from the application-specific data provider, or due to the application-specific data provider pushing user-centric facts to the user-centric AI knowledge base). As described at 1404, user-centric facts, such as the first user-centric fact, may be received via an update protocol (e.g., an update API) constraining a storage format of the user-centric fact to the application-agnostic data format. For example, the update API may constrain the storage format to use a particular data storage format such as an implementation of the node record format described above. Furthermore, the update API may constrain a maximum disk usage of the stored data, and/or require that the data be stored in an encrypted data format.

At 1405, method 1400 includes adding the first user-centric fact to the graph data structure in the application-agnostic data format. For example, adding the first user-centric fact to the graph data structure may include translating the first user-centric fact into the node record format described above with reference to FIGS. 10A-12B, and storing the resulting node record at a storage location associated with a node record identifier of the node record. The first user-centric fact may be an application-specific fact. Accordingly, at 1406, the graph data structure may store a facet pointer indicating auxiliary application-specific data associated with the application-specific fact, as described above with regards to FIGS. 10A-12B.

At 1406, the graph data structure optionally may store an application-agnostic enrichment, e.g., an application-agnostic fact associated with the application-specific fact. The enrichment may be included in the user-centric fact as received from the application-specific data provider. Alternately or additionally, the user-centric fact as provided by the application-specific data provider may be preprocessed to include one or more enrichments via an enrichment pipeline including one or more enrichment adapters. When the graph data structure stores tags associated with a user-centric fact (e.g., tags stored in a node record), the one or more enrichments may be included among the tags.

In an example, an enrichment adapter includes a machine learning model configured to receive an application-specific fact, to recognize a relevance of the application-specific fact to a user, and to output a confidence value numerically indicating the relevance. The machine learning model may be any suitable model, e.g., a statistical model or a neural network. The machine learning model may be trained, e.g., based on user feedback. For example, when the machine learning model is a neural network, output of the neural network may be assessed via an objective function indicating a level of error of a predicted relevance output by the neural network, as compared to an actual relevance indicated in user feedback. The gradient of the objective function may be computed in terms of the derivative of each function in layers of the neural network using backpropagation. Accordingly, weights of the neural network may be adjusted based on the gradient (e.g., via gradient descent) to minimize a level of error indicated by the objective function. In some examples, a machine learning model may be trained for a particular user based on direct feedback provided by the user while interacting with a software application, e.g., indicating relevance of search results in a search application. Accordingly, the trained machine learning model may be able to estimate relevance to the user. In some examples, the machine learning model may be trained based on indirect feedback from the user, e.g., by estimating a similarity of relevant content to other content that the user indicated to be relevant in the past.

In another example, an enrichment adapter includes a natural language program for recognizing natural language features of an application-specific fact. For example, the natural language program may determine a subject graph node and/or object graph node for the application-specific fact, by recognizing a natural language feature as being associated with an existing subject and/or object graph node. In some examples, the natural language program may determine a relationship type for an edge for the application-specific fact. In some examples, the natural language program may determine one or more tags of a subject graph node and/or object graph node for the application-specific fact. The natural language program may be configured to recognize features including: 1) named entities (e.g., people, organizations, and/or objects), 2) intents (e.g., a sentiment or goal associated with a natural language feature), 3) events and tasks (e.g., a task the user intends to do at a later time), 4) topics (e.g., a topic that a user-centric fact contains or represents), 5) locations (e.g., a geographic location referred to by a user-centric fact, or a place where a user-centric fact was generated), and/or 6) dates and times (e.g., a timestamp indicating a past event or a future scheduled event associated with a user-centric fact).

The enrichments associated with user-centric facts may provide enriched semantics of the user-centric facts (e.g., additional meaningful information, beyond information provided by the connection structure formed by an edge between a subject graph node and object graph node of the user-centric fact). The graph data structure may recognize and include additional user-centric facts that may be derived from the enriched semantics (e.g., based on one or more enrichments added in the enrichment pipeline). Accordingly, adding a user-centric fact including one or more enrichments may further include recognizing an additional user-centric fact based on the one or more enrichments, and adding the additional user-centric fact to the graph data structure in the application-agnostic data format.

Recognizing the additional user-centric fact based on the one or more enrichments may include recognizing that an enrichment of the one or more enrichments corresponds to another user-centric fact already included in the graph data structure (e.g., because the enrichment is associated with a subject noun or object noun of the other user-centric fact). Alternately or additionally, recognizing the additional user-centric fact based on the one or more enrichments may include recognizing a first enrichment of the one or more enrichments that is associated with a subject noun not yet involved in any user-centric facts, recognizing that a second enrichment of the one or more enrichments is associated with an object noun, recognizing a relationship between the subject noun and the object noun, and adding a new user-centric fact involving the object noun and subject noun to the graph data structure. In some examples, recognizing the additional user-centric fact based on the one or more enrichments includes recognizing any suitable relationship among the one or more enrichments, and adding a user-centric fact representing the recognized relationship.

In an example, a first node and a second node each include an enrichment specifying a recognized named entity, wherein both enrichments specify the same named entity. Accordingly, the graph data structure may store an edge connecting the first node to the second node, and the relationship type of the edge may indicate that the two nodes were inferred to be associated with the same entity. Alternately or additionally, the graph data structure may store a node cross-reference in each node, indicating that the other node is associated with the same named entity. Alternately, the graph data structure may modify the first node to include data of the second node and delete the second node, thereby avoiding the redundant storage of data of the second node by collapsing the representation to include a single node instead of two nodes.

In another example, a first node includes an enrichment specifying a named entity, and an edge may be added connecting the first node to a second node that represents the same named entity. In another example, an edge may be added between a first node and a second node that have the same associated topic. In another example, an edge may be added between a first node and a second node that have the same associated time and/or location. For example, an edge may be added between a first node that refers to a specific calendar date (e.g., in a tag) and a second node that was created on the specific calendar date (e.g., as indicated by access metadata). In another example, an edge may be added between two nodes that were created at the same location or that refer to the same location.

At 1407, adding a user-centric fact to the graph data structure in the application-agnostic data format optionally includes storing the user-centric fact as an encrypted user-centric fact, wherein access to the encrypted user-centric fact is constrained by a credential. For example, the credential may be a user account credential associated with the user, and the encrypted user-centric fact may only be readable by the holder of the user account credential. In another example, the credential may be an enterprise account credential associated with a user in an enterprise computer network, and the encrypted user-centric fact may only be readable by the holder of the enterprise account credential and by one or more administrators of the enterprise computer network. The user-centric fact received from the application-specific data provider may be received as an encrypted user-centric fact, encrypted using the credential. If so, the encrypted user-centric fact may be stored in the same encrypted form using the same credential, without decrypting and re-encrypting the encrypted user-centric fact. Furthermore, the encrypted user-centric fact may be encrypted with a homomorphic encryption scheme, in which case the encrypted user-centric fact may be modified (e.g., to add enrichments) without decrypting and re-encrypting the encrypted user-centric fact, before storing the modified, encrypted user-centric fact. Alternately, the user-centric fact received from the application-specific data provider may be encrypted using a different credential, in which case the received user-centric fact may be decrypted and re-encrypted using the credential, before storing the resulting re-encrypted user-centric fact. Alternately, the user-centric fact received from the application-specific data provider may not be encrypted, in which case the received user-centric fact may be encrypted using the credential before storing the resulting encrypted user-centric fact.

In addition to storing user-centric facts as encrypted user-centric facts, the graph data structure may provide additional privacy and security by flushing the graph data structure to redact one or more user-centric facts, responsive to a flush trigger. For example, the flush trigger may be a user command to redact the one or more encrypted user-centric facts. The user command may indicate specific user-centric facts (e.g., user-centric facts responsive to a particular query, or user-centric facts from a particular range of times/dates). Alternately or additionally, the user command may indicate that the entire user-centric AI knowledge base should be redacted. In another example, the flush trigger may be an automatically scheduled trigger, e.g., occurring periodically, or occurring once at a particular scheduled time in the future.

At 1408, method 1400 includes receiving a second user-centric fact from a second application-specific data provider associated with a second computer service, different than the first computer service. The second user-centric fact may be received in any suitable manner (e.g., as described above with regard to receiving the first user-centric fact).

At 1409, method 1400 includes adding the second user-centric fact to the graph data structure in the application-agnostic data format. The second user-centric fact may be added to the graph data structure in any suitable manner (e.g., as described above with regard to adding the first user-centric fact to the graph data structure). The application-agnostic data format may facilitate a user-centric AI knowledge base with improved utility (e.g., in answering user queries) compared to a knowledge base that only includes user-centric facts derived from a single computer service. Although the first user-centric fact and the second user-centric fact may be received from two different computer services, which may have different, incompatible native data formats, both the first user-centric fact and the second user-centric fact may be saved in the same application-agnostic data format. Furthermore, although the above examples include user-centric facts from two different computer services, there is no limit to the number of different computer services that may contribute to the knowledge base. Additionally, there is no requirement that the different computer services be related to each other or to the user-centric AI knowledge base in any particular way (e.g., the different computer services and the user-centric AI knowledge base may be mutually unrelated and provided by different computer service providers). Accordingly, the user-centric knowledge AI base may include user-centric facts derived from a plurality of different computer services, thereby including more user-centric facts from more different contexts. Furthermore, the cross-references between application-specific constituent graph structures enable user-centric facts to express relationships between aspects of the different computer services, which may further improve utility compared to maintaining a plurality of different, separate knowledge bases without cross-references.

In some cases, the second user-centric fact may have the same subject noun as a first user-centric fact already stored in the graph data structure, while having an object noun and edge differing from those of the first user-centric fact. Accordingly, adding the second user-centric fact may include recognizing that the second user-centric fact has the same subject noun as the first user-centric fact, and modifying a node record representing the first user-centric fact to include a new edge record representing a new outgoing edge from the subject noun to the object noun of the second user-centric fact. Accordingly, the node record may initially represent the first user-centric fact, and the node record may subsequently be updated to additionally represent the second user-centric fact.

At 1410, method 1400 optionally includes outputting a subset of user-centric facts included in the graph data structure responsive to a query, where the subset of user-centric facts is selected to satisfy a set of constraints defined by the query. Responding to the query may be done in any suitable manner, for example according to method 1500 of FIG. 15.

Figure 15:
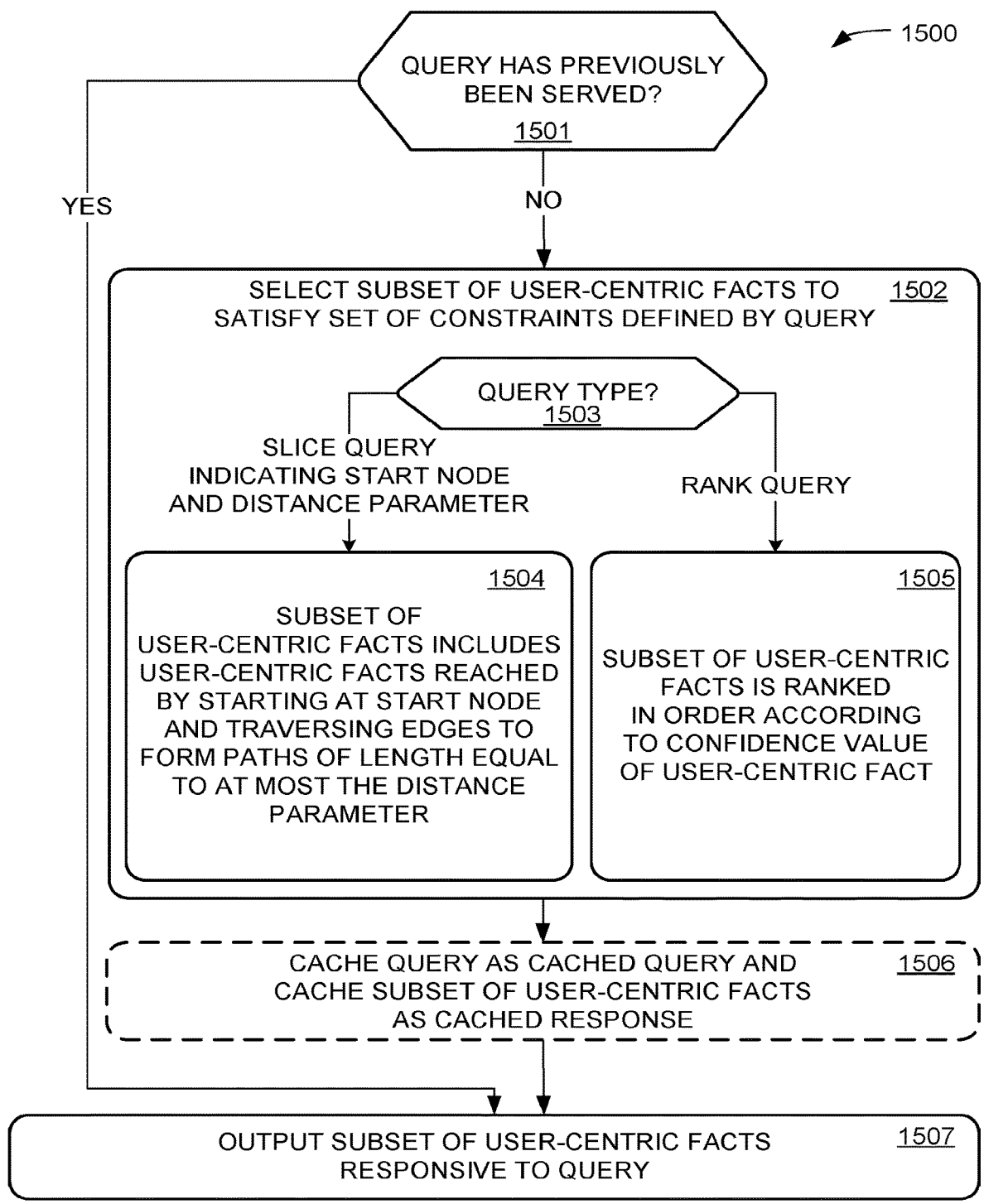
FIG. 15 shows a method of querying a user-centric artificial intelligence knowledge base.

FIG. 15 shows an exemplary method 1500 for responding to a query. A query defines a set of constraints that may be satisfiable by a subset of the user-centric facts in the user-centric AI knowledge base. Constraints may include any suitable features of the subject graph node, object graph node, and edge defining a user-centric fact, such as any of the following: 1) a type of a subject and/or object graph node included in a user-centric fact (e.g., subject graph node represents a person); 2) an identity of a subject and/or object graph node included in the user-centric fact (e.g., object graph node represents a specific email message); 3) a type of edge connecting the subject graph node and the object graph node; 4) a confidence value of the subject graph node, object graph node, and/or edge; 5) a range of dates and/or times of day associated with the subject graph node, object graph node, and/or edge; and/or 6) any other features of the subject graph node, object graph node, and/or edge, such as access metadata and/or tags of the subject graph node. An answer to a query includes a subset of the user-centric facts that satisfies the set of constraints, or an indication that the set of constraints could not be satisfied.

A query may be received in any suitable manner. For example, a query may be received via a query protocol (e.g., a query API) that allows a client to programmatically define the set of constraints in a computer-readable query format. Alternately, a query may be received as a natural language query and converted into a set of constraints by recognizing constraints using a natural language processing technique. For example, the user-centric AI knowledge base may be able to train a semantic embedding model to represent natural language queries and sets of constraints as points within a latent space learned by the semantic embedding model, in order to translate natural language queries into sets of constraints by recognizing a point in the latent space corresponding to a natural language query, and outputting a set of constraints corresponding to the point in the latent space. Alternately or additionally, the user-centric AI knowledge base may be able to use a parsing model (e.g., dependency parsing) to match a syntactic structure of a natural language query against a template query, and to specify a set of constraints by filling in details of the template query using details of the natural language query.

At 1501, method 1500 comprises recognizing a query that has previously been served as a cached query and outputting the cached response to serve the cached query by answering with the same subset of user-centric facts that satisfied the cached query when it was previously received. As such, at 1507, method 1500 includes outputting the previously cached subset of user-centric facts. Such caching may enable efficient (e.g., immediate) retrieval of the cached response if the cached query is received again in the future.

If the query has not yet been served, then at 1502, method 1500 includes selecting a subset of user-centric facts that satisfy the set of constraints defined by the query. The set of constraints may be satisfied by traversing the graph data structure to find user-centric facts that at least partially satisfy the constraints. The graph data structure represents structured relationships between the user-centric facts (e.g., two facts having the same subject noun may be represented by a single node record within a constituent graph and cross-referenced between constituent graphs). As such, it may be more efficient to traverse the graph data structure to find user-centric facts satisfying the query, than it would be to exhaustively search the collection of user-centric facts. For example, if a user has frequently interacted with a particular other person, the frequent interaction may indicate that the other person is likely relevant to the user. Accordingly, there may be more user-centric facts having that person as subject or object, and while traversing edges of the graph data structure, encountering a node representing the other person may be more likely because of the many edges leading to and from the node representing the other person.

Traversing the graph data structure may include a "random walk" along edges of the graph data structure. The random walk may start at a current user context, used herein to refer to any suitable start point for answering a query. In examples, a current user context may be defined by the query (e.g., by including a context keyword indicating a subject graph node to use as the start point). In other examples, a current user context may be an application-specific context (e.g., "answering email") suitable to determine a subject graph node to use as the start point.

When encountering a node during the random walk (e.g., at the start point), the node may be examined to determine if it satisfies the constraints of the query. If it does, it may be output in the subset of user-centric facts responsive to the query. Then, after encountering the node, the random walk may continue, so that more nodes are encountered. To find more nodes, the random walk may continue along outgoing edges of the encountered node. Determining whether to continue along an outgoing edge may be a weighted random determination, including assessing a weight representing a likelihood of following the edge and sampling whether to follow the edge based on the weight and random data, e.g., a "roulette wheel selection" algorithm implemented using a random number generator. The weight of an edge connecting a subject graph node to an object graph node may be determined based on the confidence value of the subject graph node, the edge, and/or the object graph node. In an example, the confidence values may be interpreted as indications of relevance to the user, so that edges which are more relevant or which connect more relevant nodes are more likely to be followed. The weight of the edge may be further determined based on other data of the subject graph node, object graph node, and edge, e.g., by assessing a relevance of an edge to the query based on a natural language comparison of the edge type to one or more natural language features of the query.

By specifying constraints (e.g., features of the subject graph node, object graph node, and edge defining a user-centric fact), a user may be able to formulate a variety of queries to be answered using the user-centric AI knowledge base.

In addition to selecting a subset of user-centric facts satisfying constraints specified in a query, the user-centric AI knowledge base may enable responding to other specialized queries. FIG. 15 shows two exemplary specialized queries: slice queries and rank queries.

In an example, at 1504, the query is a slice query indicating a start node and a distance parameter. The answer to a slice query is a subset of user-centric facts including user-centric facts reached by starting at the start node and traversing edges of the graph data structure to form paths of length equal to at most the distance parameter away from the start node. For example, if the distance parameter is set to 1, the answer to the query will include the start node and all once-removed nodes directly connected to the start node; and if the distance parameter is set to 2, the answer to the query will include the start node, all once-removed nodes, and all twice-removed nodes directly connected to at least one of the once-removed nodes. A slice query may represent a collection of user-centric facts which are potentially relevant to a particular user-centric fact of interest (e.g., a user-centric fact involving the start node), by way of being connected to the start node by a path of at most the distance parameter. By setting a small distance parameter, the answer to the query may represent a relatively small collection of facts that are closely related to the start node; similarly, by setting a large distance parameter, the answer may represent a large collection of facts that are indirectly related to the start node. As an alternative to specifying a start node, a query may also use a current user context as the start node, thereby representing a collection of user-centric facts related to the user's current context.

In another example, at 1505, the query is a rank query to rank the plurality of user-centric facts based at least on a confidence value associated with each user-centric fact, and the subset of user-centric facts is ranked in order according to the confidence value of each user-centric fact. A rank query may be interpreted as gathering user-centric facts which are likely to be relevant to the user, without imposing additional specific constraints on the query. In addition to ranking the plurality of user-centric facts based on a confidence value, the plurality of user-centric facts may be ranked based on other features. For example, user-centric facts may be weighted as more relevant if they are more recent (e.g., according to a timestamp associated with each fact). In another example, a rank query may include a keyword and user-centric facts may be weighted as more relevant if they include at least one node having the keyword among its tags.

Although FIG. 15 depicts two examples of specialized queries, a user-centric AI knowledge base enables other kinds of specialized query not depicted in FIG. 15. For example, the subset of user-centric facts responsive to a slice query may additionally be ranked by confidence value as in a rank query, thereby combining functionality of the two kinds of query. In another example, a query is a pivot query indicating a start node. The answer to a pivot query is a subset of user-centric facts including user-centric facts reached by starting at the start node and traversing edges of the graph data structure to form paths of an unbounded (or arbitrary, large) length. A pivot query may be interpreted as a slice query that does not bound the length of paths reached by the start node, e.g., where the distance parameter is infinite. In some examples, an answer to a query may include a visualization of the answer subset of user-centric facts as a graph diagram (e.g., as in FIG. 2A), which may be annotated or animated to include any suitable information of the user-centric facts (e.g., auxiliary application-specific data indicated by a facet pointer of a node included in one of the user-centric facts).

A query may define a time constraint, so that a subset of user-centric facts output in response to the query is restricted to user-centric facts associated with timestamps indicating times within a range defined by the query. In some examples, time is an inherent property of nodes and edges in the graph data structure (e.g., each user-centric fact of the plurality of user-centric facts included in the graph data structure is associated with one or more timestamps). The one or more timestamps associated with a node or edge may indicate a time when a user-centric fact was created, accessed, and/or modified (e.g., access metadata of a node included in the user-centric fact). Alternately or additionally, the one or more timestamps may indicate a time referred to in a user-centric fact (e.g., a time at which a meeting is scheduled, or any other timestamp added by an enrichment adapter in the enrichment pipeline). The one or more timestamps may optionally be stored as searchable tags.

In some examples, the one or more constraints defined by a query include an answer type constraint, and accordingly, the subset of user-centric facts selected responsive to the query may include only user-centric facts that satisfy the answer type constraint. For example, an answer type constraint may constrain a feature of a subject graph node, object graph node, and/or edge of the user-centric fact. For example, an answer type constraint may indicate a particular type of subject and/or object graph node, such as: 1) either subject or object is a person; 2) both subject and object are coworkers; 3) subject is a place; 4) object is a topic; or 5) subject is a person and object is a scheduled event. Alternately or additionally, the answer type constraint may indicate one or more particular subjects and/or objects, such as 1) subject is the user; 2) subject is the user's boss, Alice; or 3) object is any of Alice, Bob, or Charlie. Alternately or additionally, the answer type constraint may indicate one or more particular types of edge, e.g., by indicating a type of relationship such as a "sent email" relationship, a "went to lunch together" relationship, or a "researched topic" relationship.

In some examples, the one or more constraints defined by the query may include a graph context constraint, and accordingly, the subset of user-centric facts selected responsive to the query may include only user-centric facts that are related to a contextualizing user-centric fact in the user-centric AI knowledge base that satisfies the graph context constraint. Two different user-centric facts may be described herein as related based on any suitable features of the graph data structure that may indicate a possible relationship. For example, when a graph context constraint indicates the user's boss, Alice, the contextualizing user-centric fact may be any fact having a node representing Alice as a subject graph node or as an object graph node. Accordingly, the subset of user-centric facts selected responsive to the query may include other user-centric facts having subject and/or object graph nodes that are directly connected, via an edge, to the node representing Alice. Alternately or additionally, the subset of user-centric facts may include user-centric facts that are indirectly related to Alice, e.g., a user centric fact having a subject and/or object graph node that is indirectly connected, via a path of two or more edges, to the node representing Alice. In some cases, a query including a graph context constraint may be a slice query, and the subset of user-centric facts may include only user-centric facts that are related to the contextualizing user-centric fact and reachable within at most a particular distance of a node of the contextualizing user-centric fact. In other examples, a query including a graph context constraint may be a rank query, and the subset of user-centric facts may include a selection of user-centric facts that are most likely to be relevant to the contextualizing user-centric fact, e.g., user-centric facts that are connected to the contextualizing user-centric fact via many different paths, or via a path including edges having high confidence values.

Answering a query may include traversing the graph data structure based on the one or more timestamps associated with each user-centric fact, which may be referred to herein as traversal of a time dimension of the graph data structure. For example, answering a query may include starting at a node associated with a time defined by the query, and traversing the graph by following any edge with a timestamp indicating a later time, so that the timestamps increase in the same order as the traversal. In other examples, answering a query may include traversing the graph data structure by following any edge with a timestamp preceding a date defined by the query. Furthermore, the inherent time property of each node and edge in the graph data structure may enable a timeline view of the graph data structure. In examples, an answer to a query may include a timeline view of the graph data structure, e.g., user-centric facts arranged in chronological order by a timestamp associated with each user-centric fact.

As another example of a specialized query, the graph data structure may be configured to allow searching for a user-centric fact based on a searchable tag stored by the graph data structure for the user-centric fact. Searching for a user-centric fact based on a searchable tag may include traversing the graph in any suitable manner (e.g., as described above with regards to slice queries or pivot queries), and while traversing the graph, outputting any user-centric facts encountered during the traversal for which the graph structure stores the searchable tag.

As another example of a specialized query, the graph data structure may be configured to serve a user context query, by searching for user-centric facts that may be relevant to a current context of a user. Accordingly, the user context query may include one or more constraints related to the current context of the user. For example, the one or more constraints may include a time constraint based on a current time at which the user context query is served. Alternately or additionally, the one or more constraints may include a graph context constraint related to the current context of the user, e.g., a graph context constraint specifying a task in which the user may be engaged.

In some examples, the one or more constraints of the user context query may be based on state data of a computer service that issued the user context query. In some examples, the state data of the computer service includes a natural language feature (e.g., an intent, entity, or topic), and the one or more constraints include an indication of the natural language feature. For example, when the computer service is an email program, the one or more constraints of a user context query may include: 1) a time constraint based on a time at which a user begins composing an email; 2) a graph context constraint indicating a topic of a subject of the email; and 3) a graph context constraint indicating a recipient of the email. Accordingly, a subset of user-centric facts selected responsive to the user context query may include user-centric facts which are current (based on the timestamp) and which are likely to be related to the user's task of composing the email (based on the topic and recipient).

After selecting a subset of user-centric facts responsive to the query, the subset of user-centric facts may be cached to enable immediate reply to the same query in the future. Accordingly, at 1506, method 1500 optionally comprises caching the query as a cached query and caching the subset of user-centric facts responsive to the query as a cached response. Then, at 1507, method 1500 includes outputting the subset of user-centric facts responsive to the query, which may include outputting the selected subset of user-centric facts directly, or after caching the selected subset of user-centric facts, outputting the resulting cached subset of user-centric facts.

When the graph data structure includes encrypted user-centric facts, the graph data structure may be filtered to create a filtered graph data structure excluding one or more encrypted user-centric facts, and including other user-centric facts without revealing that the one or more encrypted user-centric facts were excluded. For example, the encrypted user-centric facts to be excluded may be selected by the user (e.g., by selecting encrypted user-centric facts responsive to a query, or by selecting encrypted user-centric facts from a particular time/date range). The filtered graph data structure may still be useable to answer queries, but without including in the answer any of the encrypted user-centric facts. The filtered graph data structure omits the excluded user-centric facts without indicating the absence of the excluded user-centric facts in any way. For example, an answer would not indicate that one or more encrypted user-centric facts were present but redacted. Instead, the answer would merely omit the one or more encrypted user-centric facts, while possibly including other user-centric facts.

A user-centric AI knowledge base that leverages the above-described graph data structure may support improved interactions between a user and one or more computer services. A computer service may act as an application-specific data provider by providing data (e.g., user-centric facts) to the user-centric AI knowledge base. Alternately or additionally, the computer service may use the user-centric AI knowledge base in order to answer a query. For example, a computer service may be able to use the user-centric AI knowledge base to provide information to a user (e.g., in response to a user query). In some examples, a computer service may be configured to automatically perform an action to assist a user based on user-centric facts in the user-centric AI knowledge base.

When each computer service of a plurality of computer services contributes user-centric facts to the user-centric AI knowledge base, the user-centric AI knowledge base may facilitate the sharing of information among the plurality of computer services. Accordingly, the user-centric AI knowledge base may enable one or more computer services to assist the user in a coordinated manner. For example, a first computer service may provide one or more user-centric facts to the user-centric AI knowledge base, and a second computer service may perform an action to assist the user based on the one or more user-centric facts. In this manner, the second computer service may provide functionality that is relevant to the first computer service, even when data required to provide such functionality is not available directly within the second computer service, and when such functionality is not included in the first computer service.

Examples of computer services which may use the user-centric AI knowledge base include: 1) a computerized personal assistant; 2) an email client; 3) a calendar/scheduling program; 4) a word processing program; 5) a presentation editing program; 6) a spreadsheet program; 7) a diagramming/publishing program; 8) an integrated development environment (IDE) for computer programming; 9) a social network service; 10) a workplace collaboration environment; and 11) a cloud data storage and file synchronization program. However, the utilization of the user-centric AI knowledge base is not limited to the above examples of computer services, and any computer service may use the user-centric AI knowledge base in any suitable manner, e.g., by providing data and/or by issuing queries.

Computer services which utilize the user-centric AI knowledge base may be $1^{st}$ party computer services authored and/or administered by an organization or entity which administers the user-centric AI knowledge base, or $3^{rd}$ party services authored and/or administered by a different organization or entity. Computer services may utilize the user-centric AI knowledge base via one or more APIs of the user-centric AI knowledge base (e.g., an update API and a query API), wherein each API is useable by a plurality of different computer services including $1^{st}$ party computer services and $3^{rd}$ party services.

Figure 16:
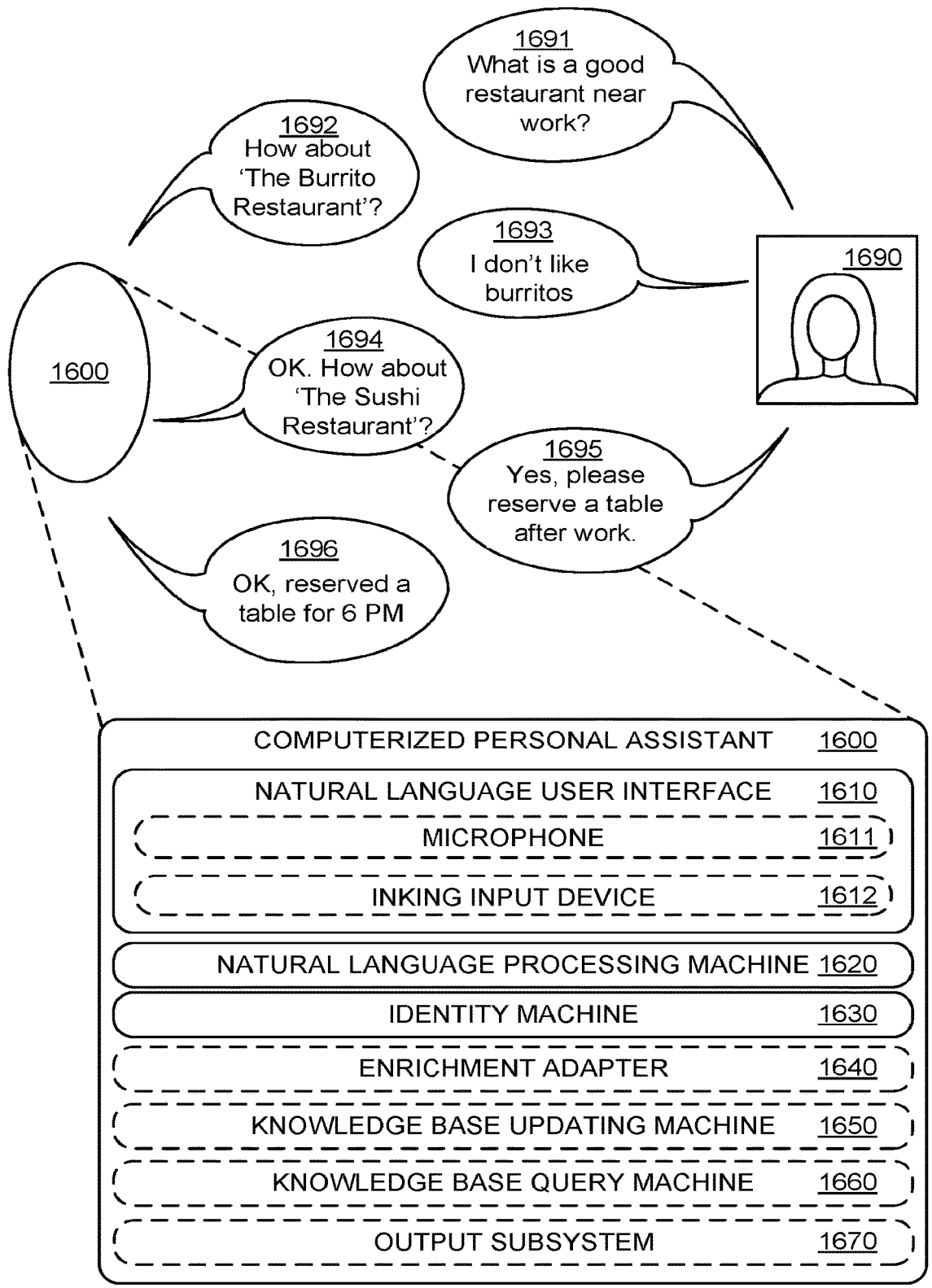
FIG. 16 shows an exemplary computerized personal assistant.

FIG. 16 shows an exemplary computer service in the form of a computerized personal assistant 1600. Computerized personal assistant 1600 may utilize functionality of a user-centric AI knowledge base. For example, in computing environment 1300 of FIG. 13, computerized personal assistant 1600 is communicatively coupled to graph storage machine 1301 which implements a user-centric AI knowledge base. Accordingly, computerized personal assistant may be configured to interact with graph storage machine 1301 in order to provide user-centric facts to the user-centric AI knowledge base and in order to issue queries to be served by the user-centric AI knowledge base. Computerized personal assistant 1600 may be a stand-alone computer service or an assistance component of another computer service (e.g., email/calendar application, search engine, integrated development environment).

Computerized personal assistant 1600 includes a natural language user interface 1610 configured to receive user input and/or user queries. Natural language user interface 1610 may include a keyboard or any other text input device configured to receive user input in the form of text. Natural language user interface 1610 may include a microphone 1611 configured to capture speech audio. Accordingly, the user input and/or user queries received by natural language user interface 1610 may include the speech audio captured by the microphone. In some examples, natural language user interface 1610 is configured to receive user speech audio and to output text representing the user speech audio. Alternately or additionally, natural language user interface 1610 may include an inking input device 1612 and the user input received by natural language user interface 1610 may include user handwriting and/or user gestures captured by the inking input device. "Inking input device" may be used herein to refer to any device or combination of devices which may allow a user to provide inking input. For example, an inking input device may include any device which allows the user to indicate a series of two- or three-dimensional positions relative to a display or any other surface, e.g., 1) a capacitive touch screen controlled by a user's finger; 2) a capacitive touch screen controlled by a stylus; 3) a "hover" device including a stylus and a touch screen configured to detect a position of the stylus when the stylus is in proximity to the touch screen; 4) a mouse; or 5) a video game controller. In some examples, an inking input device may alternately or additionally include a camera configured to detect user gestures. For example, a camera may be configured to detect gestures based on three-dimensional movements of the user's hand. Alternately or additionally, a camera (e.g., a depth camera) may be configured to detect movements of the user's hand as two-dimensional positions relative to a surface or plane, e.g., relative to a plane defined by a front side of a viewing frustum of the camera.

Computerized personal assistant 1600 further includes a natural language processing (NLP) machine 1620 configured to output a computer-readable representation of the user input and/or user query received at natural language user interface 1610. Accordingly, when the natural language user interface 1610 is configured to receive user input, NLP machine 1620 is configured to output a computer-readable representation of the user input; and when the natural language user interface 1610 is configured to receive a user query, NLP machine 1620 is configured to output a computer-readable representation of a query based on the user query.

When NLP machine 1620 is configured to output the computer-readable representation of the query based on the user query, NLP machine 1620 may be further configured to output a recognized user intent based on the user query. Accordingly, the one or more constraints defined by the computer-readable representation of the query may include a constraint based on the recognized user intent.

NLP machine 1620 may be configured to parse an utterance by the user in order to recognize intents and/or entities defined by the utterance. An utterance is any user input, e.g., a sentence or sentence fragment, which may or may not be well-formed (e.g., with regard to grammar, word usage, pronunciation and/or spelling). An intent represents an action the user may wish to perform, which may include a question or task, e.g., making a reservation at a restaurant, calling a taxi, displaying a reminder at a later time, and/or answering a question. An entity may include a particular named entity (e.g., the user's boss Alice) or a placeholder representing a particular type of entity, e.g., a person, an animal, a coworker, a place, or an organization.

NLP machine 1620 may be configured to utilize any suitable natural language processing techniques. For example, NLP machine 1620 may include a dependency parser and/or a constituency parser configured to recognize a grammatical structure of an utterance. NLP machine 1620 may additionally be configured to recognize key-value pairs representing semantic contents of an utterance, e.g., a type of entity of an utterance paired with a name of a specific entity of that type. In some examples, components of NLP machine 1620 (e.g., the dependency parser) may utilize one or more machine-learning technologies. Non-limiting examples of such machine-learning technologies can include Feedforward Networks, Recurrent Neural Networks (RNN), Long Short-term Memory (LSTM), Convolutional Neural Networks, Support-vector Machines (SVM), Generative-Adversarial Networks (GAN), Variational Autoencoders, Q-Learning, and Decision Trees. The various identifiers, engines, and other processing blocks described herein may be trained via supervised and/or unsupervised learning utilizing these, or any other appropriate, machine learning technologies to make the described assessments, decisions, identifications, etc. It should be understood, however, that this description is not intended to put forth new technologies for making such assessments, decisions, identifications, etc. Instead, this description is intended to manage computational resources, and as such, is meant to be compatible with any type of processing module, including processing modules that have not yet been developed.

In some examples, NLP machine 1620 may be configured to recognize a predefined set of intents and/or entities. Alternately or additionally, NLP machine 1620 may be trained based on example utterances. In some examples, NLP machine 1620 may be configured to recognize a new intent and/or entity by supplying NLP machine 1620 with a number of labelled examples, where a labelled example includes a new intent to be recognized along with an exemplary utterance annotated to denote relevant entities. NLP machine 1620 may be trained for the specific purpose of parsing utterances in the context of computerized personal assistant 1600, so that the accuracy and/or performance of NLP machine 1620 is optimized for computerized personal assistant 1600. For example, when NLP machine 1620 is based on one or more neural networks, training NLP machine 1620 may include training the one or more neural networks via stochastic gradient descent using the back-propagation algorithm.

In some cases, NLP machine 1620 may be configured to recognize a particular human language, e.g., English. Alternately or additionally, NLP machine 1620 may be configured to recognize a plurality of different human languages. When NLP machine 1620 is configured to recognize a plurality of different human languages, NLP machine 1620 may be able to process utterances including words in multiple different languages.

In some examples, computerized personal assistant 1600 may be implemented as an all-in-one computing device contained within a single enclosure. For example, the all-in-one computing device may include one or more logic machines and one or more storage machines holding instructions executable by the logic machines to provide the functionality of natural language user interface 1610, NLP machine 1620, identity machine 1630, enrichment adapter 1640, knowledge base updating machine 1650, knowledge-base query machine 1660, and output subsystem 1670. In some examples, the all-in-one computing device may additionally include one or more input devices (e.g., microphone 1611 and/or inking input device 1612). In some examples, the all-in-one computing device may include one or more output devices (e.g., a display and/or a speaker included in output subsystem 1670). Alternately or additionally, the all-in-one computing device may include a communication subsystem configured to communicatively couple to other computer services (e.g., as part of output subsystem 1670).

In some examples, one or more components of computerized personal assistant 1600 (e.g., natural language user interface 1610, NLP machine 1620, identity machine 1630, enrichment adapter 1640, knowledge base updating machine 1650, knowledge-base query machine 1660, and/or output subsystem 1670) may be configured to cooperate with one or more other computer services (e.g., other computing devices) in order to perform calculations, transform data, and implement the above-described functionality of the one or more components.

In an example, computerized personal assistant 1600 may be implemented across two or more different computing devices. For example, NLP machine 1620 may offload one or more natural language processing tasks to one or more cloud services, e.g., cloud services 1311 of computing environment 1300 as shown in FIG. 13. Accordingly, cloud services 1311 may be configured to process natural language as described above and to return the computer-readable representation of the user input to computerized personal assistant 1600 to be output at NLP machine 1620. In some examples, NLP machine 1620 may partially pre-process the user input before sending pre-processed input to be further processed by cloud services 1311, and/or post-process the computer-readable representation of the pre-processed input received from cloud services 1311 before outputting a post-processed computer-readable representation of the pre-processed input at NLP machine 1620. For example, the remote computer service may be a cloud service providing cloud processing of natural language inputs, such as the MICROSOFT LUIS™ language understanding service.

Alternately or in addition to offloading functionality of NLP machine 1620 to cloud services 1311 in the above-described manner, any other component(s) of computerized personal assistant 1600 may similarly be configured to offload tasks to cloud services 1311 or to any other computing device(s) (e.g., graph storage machine 1310, application-specific data provider 1321, and/or user computer 1340). In this manner, functionality of a component of computerized personal assistant 1600 may utilize hardware and/or software included in computerized personal assistant 1600 in addition to utilizing other computer devices and/or computer services.

For example, knowledge base updating machine 1650 may be configured to offload tasks to graph storage machine 1310, e.g., adding new user-centric facts to a user-centric knowledge base. Accordingly, in order to add new user-centric facts to the user-centric knowledge base, knowledge base updating machine 1650 may be configured to provide user-centric facts, via network 1310, to graph storage machine 1301, and to receive a subset of user-centric facts selected responsive to the query, the subset of user-centric facts included in the user-centric AI knowledge base implemented by graph storage machine 1301.

Alternately or additionally, knowledge base query machine 1660 may be configured to offload tasks to graph storage machine 1310, e.g., issuing queries to be served by the user-centric knowledge base. Accordingly, in order to issue a query to be served by the user-centric knowledge base, knowledge base query machine 1660 may be configured to provide user-centric facts, via network 1310, to graph storage machine 1301, and to receive a response based on the subset of user-centric facts (e.g., a textual answer to the query based on the subset of user-centric facts).

Computerized personal assistant 1600 further includes an identity machine 1630 configured to associate the user input with a particular user. Identity machine 1630 may use any suitable information to determine an identity of a user. For example, when natural language user interface 1610 includes a microphone and when the user input includes speech audio, identity machine 1630 may include a speaker recognition engine configured to distinguish between users based on speech audio. Alternately or additionally, when computerized personal assistant 1600 includes a camera (e.g., as part of natural language user interface 1610), identification machine 1630 may include a face recognition engine configured to distinguish between users based on photographs of user faces. Alternately or additionally, identification machine 1630 may be configured to receive biometric information (e.g., user fingerprints) and to distinguish between users based on the biometric information. Alternately or additionally, identification machine 1630 may be configured to prompt the user to provide identification (e.g., login info such as a username and password).

In examples where the user-centric AI knowledge base includes one or more encrypted user-centric facts, access to the one or more encrypted user-centric facts may be constrained by a credential associated with a particular user. Accordingly, a computerized personal assistant associated with the particular user may need to provide the credential in order to access (e.g., read and/or modify) the user-centric AI knowledge base. Accordingly, identity machine 1630 may be configured to identify the particular user and to supply the credential associated with the particular user. For example, identity machine 1630 may store the credential, e.g., as a digital certificate, in order to supply the credential whenever computerized personal assistant 1600 provides user-centric facts to the user-centric AI knowledge base or issues queries to be served by the user-centric AI knowledge base.

Optionally, in some examples, computerized personal assistant 1600 further includes an enrichment adapter 1640 configured to output an enrichment based on the computer-readable representation of the user input, wherein the new or updated user-centric fact includes the enrichment output by the enrichment adapter. For example, the enrichment adapter 1640 may be configured to add any of the enrichments described above with regard to FIG. 14, e.g., 1) named entities, 2) intents, 3) events and tasks, 4) topics, 5) locations, and/or 6) dates and times. In some examples, enrichment adapter 1640 is an enrichment pipeline including a plurality of enrichment adapters each configured to output an enrichment, wherein the new or updated user-centric fact includes all of the enrichments output by each enrichment adapter of the enrichment pipeline.

Optionally, in some examples, computerized personal assistant 1600 further includes a knowledge-base updating machine 1650 configured to update a user-centric AI knowledge base associated with the particular user to include a new or updated user-centric fact based on the computer-readable representation of the user input. Knowledge-base updating machine 1650 may update the user-centric AI knowledge base via an update protocol (e.g., an update API). The update protocol may be useable by a plurality of different computer services. The update protocol may constrain a storage format of the new or updated user-centric fact to an application-agnostic data format, as described above with reference to FIG. 14.

Optionally, in some examples, computerized personal assistant 1600 further includes a knowledge-base query machine 1660 configured to query a user-centric artificial intelligence knowledge base associated with the particular user and to output a response based on a subset of user-centric facts in the user-centric artificial intelligence knowledge base satisfying one or more constraints defined by the computer-readable representation of the user query. The knowledge-base query machine may be configured to query the user-centric AI knowledge base via a query protocol (e.g., a query API) useable by a plurality of different computer services.

In some examples, the one or more constraints defined by the computer-readable representation of the query may include an answer type constraint, and accordingly the subset of user-centric facts may include only user-centric facts that satisfy the answer type constraint. Alternately or additionally, the one or more constraints defined by the computer-readable representation of the query may include a graph context constraint, and accordingly the subset of user-centric facts may include only user-centric facts that are related to a contextualizing user-centric fact in the user-centric AI knowledge base that satisfies the graph context constraint. Accordingly, the subset of user-centric facts may be determined as described above with reference to FIG. 15.

In some examples, the query is a user context query to determine a current context of the user. Accordingly, the subset of user-centric facts may include one or more user-centric facts relating to the current context of the user, as described above with reference to FIG. 15. When the query is a user context query, the computer-readable representation of the query may be independent of any user query received at natural language user interface 1610 and/or interpreted at NLP machine 1620. Instead, the user context query may be issued automatically, based on any suitable data available to the computerized personal assistant (e.g., sensor data such as GPS data, time/date data, state data of the computerized personal assistant, and/or state data of any other cooperating computer service (e.g., a computer service configured to share data with the computerized personal assistant by providing user-centric facts to a user-centric AI knowledge base, and/or a computer service that may be controlled by the computerized personal assistant)).

Optionally, in some examples, computerized personal assistant 1600 includes an output subsystem 1670 configured to output data, e.g., the response to the query output by the knowledge-base query machine. For example, output subsystem 1670 may include a speech synthesis engine configured to generate speech audio based on the subset of user-centric facts selected responsive to the query, and a speaker configured to output the speech audio. In some examples, output subsystem 1670 may include a display configured to visually present a textual answer based on the subset of user-centric facts selected responsive to the query. In some examples, the display may be configured to visually present the subset of user-centric facts directly in graphical form (e.g., as a graphical depiction of a graph data structure including the subset of user-centric facts, or as a timeline including the user-centric facts arranged in chronological order).

In some examples, the response output by the knowledge-base query machine includes computer-readable instructions configured to cause a cooperating computer service to perform an action to assist the user, based on the subset of user-centric facts in the user-centric AI knowledge base satisfying the one or more constraints defined by the computer-readable representation of the query. For example, the cooperating computer service may be a software application running on one or more device(s) implementing the computerized personal assistant. In other examples, the cooperating computer service may be a networked computer service accessible via a computer network. Accordingly, output subsystem 1670 may include a communication device (e.g., a wireless radio) configured to communicatively couple to the computer network in order to convey the computer-readable instructions to the cooperating computer service.

In some examples, the action performed by the cooperating computer service to assist the user includes changing a preference setting of the cooperating computer service based on the subset of user-centric facts in the user-centric AI knowledge base satisfying the one or more constraints defined by the computer-readable representation of the query (e.g., when the query includes a request to change a particular preference setting).

In some examples, the action performed by the cooperating computer service to assist the user includes visually presenting a depiction of state data of the cooperating computer service, wherein the state data of the cooperating computer service is related to the subset of user-centric facts in the user-centric artificial intelligence knowledge base satisfying the one or more constraints defined by the computer-readable representation of the query.

Although FIG. 16 depicts a stand-alone computerized personal assistant, any other computer service may include any subset of the components depicted in FIG. 16 (e.g., a natural language user interface, an NLP machine, an identity machine, an enrichment adapter, a knowledge-base updating machine, a knowledge-base query machine, and/or an output subsystem). Such components may facilitate using the user-centric AI knowledge base as described with regard to the computerized personal assistant (e.g., by providing data to the user-centric AI knowledge base and by serving queries using the user-centric AI knowledge base). Any computer service that utilizes the user-centric AI knowledge base is a computerized personal assistant whether such a service is a stand-alone service or an assistance component of another computer service with a different primary function (e.g., email/calendar application, search engine, integrated development environment).

In an example, the user is composing an email in an email program, with a subject line "Weekly Report on Widget Development" and the user's boss, Alice, is selected as a recipient. The user may click on an 'analytics' button in order to receive suggestions for completing the email. Accordingly, the email program may issue a context query to be served by the user-centric AI knowledge base. The context query may indicate a state of the email program. Furthermore, the context query may include one or more natural language features based on the application state (e.g., the contents of the email subject line). For example, the one or more natural language features may include a recognized intent (e.g., "find information"), a recognized topic ("Widgets") and a recognized entity (e.g., the user's boss, Alice). Accordingly, the subset of user-centric facts selected responsive to the query may include user-centric facts that are relevant to the user's interactions with her boss, Alice, in addition to user-centric facts that are related to "Widgets."

Based on the subset of user-centric facts selected responsive to the query, the email program may display one or more suggestions based on the subset of user-centric facts. For example, the email program may display one or more relevant files which the user may wish to consult while preparing the email and/or attach to the email, e.g., a "Widget Report" spreadsheet file and a "Widget development notes" document file. Alternately or additionally, the email program may display one or more links from the user's web search history which may pertain to the weekly report on "Widgets" and/or to "Widgets" more generally. Alternately or additionally, the email program may display one or more relevant emails, e.g., an email from Alice saying "please include estimated development costs for the upcoming month in this week's report." Alternately or additionally, the email program may display one or more email addresses of other users who may be relevant to the email, e.g., Alice's colleague Bob, and resident widget expert Charlie. Alternately or additionally, the email program may suggest that the user schedule a meeting with Alice. The email program may be configured to suggest a particular meeting time, e.g., based on user-centric facts in the user's user-centric AI knowledge base regarding the user's availability and on additional user-centric facts in an enterprise knowledge base regarding Alice's availability.

Figure 17:
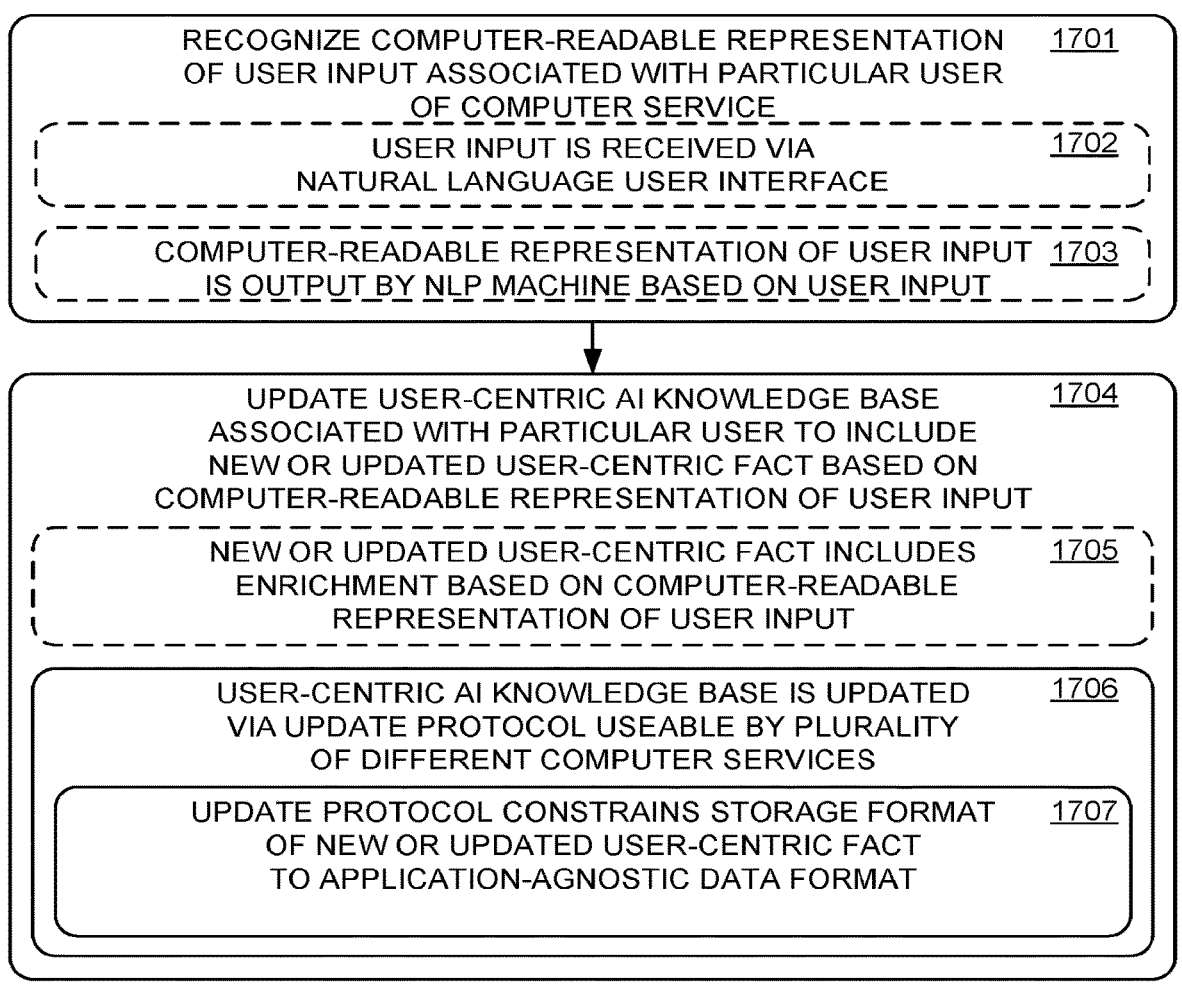
FIG. 17 shows a method for a computer service to provide one or more user-centric facts to a user-centric artificial intelligence knowledge base.
Figure 18:
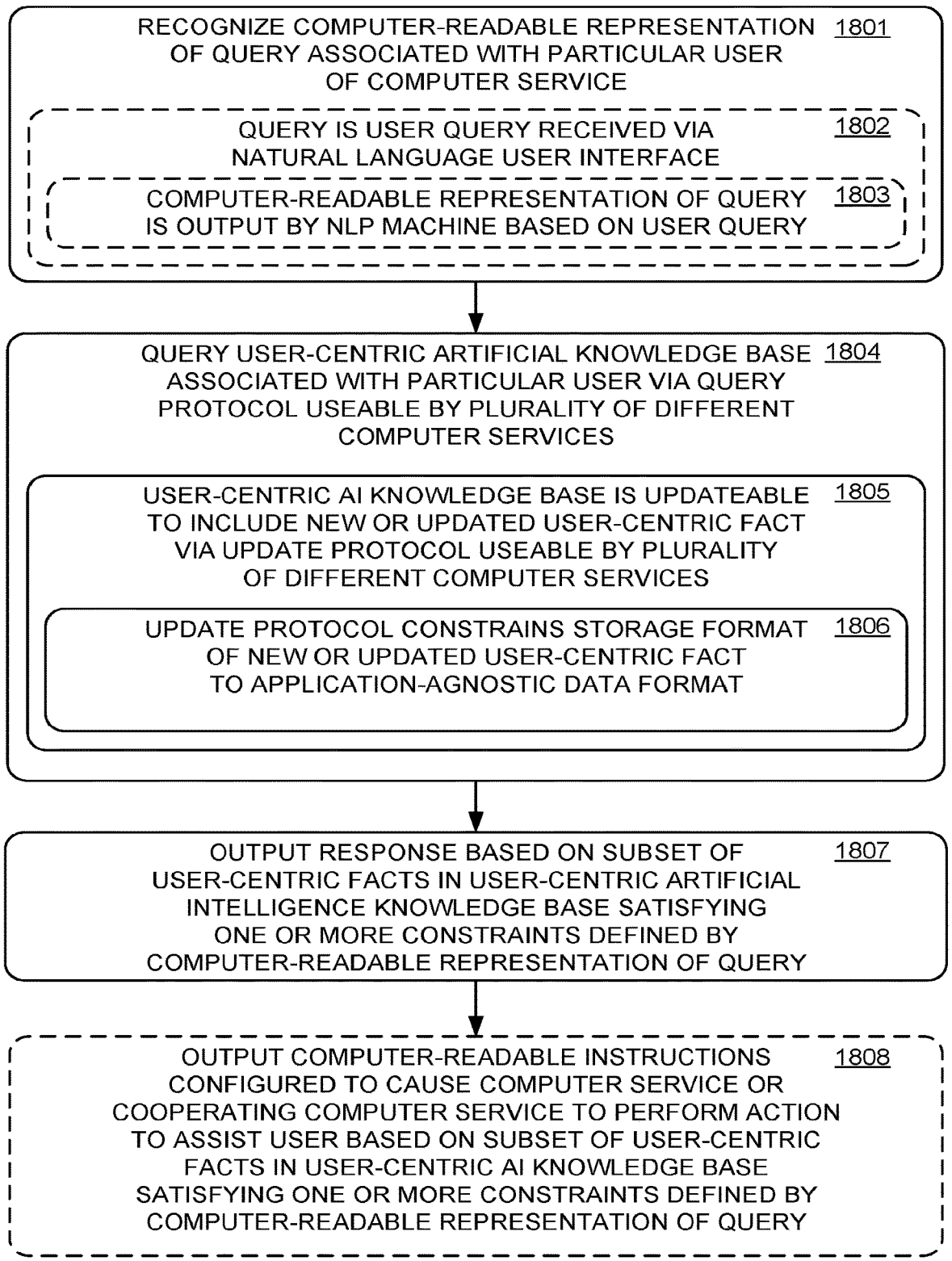
FIG. 18 shows a method for a computer service to query a user-centric artificial intelligence knowledge base.

A computer service configured to utilize the user-centric AI knowledge base may be implemented and/or organized in any suitable fashion, without being limited to the components and organization shown in FIG. 16. Accordingly, FIG. 17 shows an exemplary method 1700 for a computer service to provide data to a user-centric AI knowledge base, and FIG. 18 shows an exemplary method 1800 for a computer service to serve queries using a user-centric AI knowledge base. Method 1700 and method 1800 may be implemented by any suitable computing devices and/or computer services, such as computerized personal assistant 1600 of FIG. 16, in cooperation with any computer service that is compatible with the AI Knowledge Base.

At 1701, method 1700 of FIG. 17 includes recognizing a computer-readable representation of user input associated with a particular user of a computer service.

Optionally, in some examples, at 1702, the user input is received via a natural language user interface, such as natural language user interface 1610 of computerized personal assistant 1600 of FIG. 16. In some examples, the particular user of the computer service is recognized by an identity machine configured to associate the user input with the particular user, such as identity machine 1630 of FIG. 16.

Optionally, in some examples, at 1703, the computer-readable representation of the user input is output by an NLP machine, based on the user input. For example, the computerized personal assistant 1600 shown in FIG. 16 may be configured to output the computer-readable representation of the user input via NLP machine 1620.

At 1704, method 1700 includes updating the user-centric AI knowledge base associated with the particular user to include a new or updated user-centric fact based on the computer-readable representation of the user input. "New user-centric fact" is used herein to refer to any user-centric fact that is not yet included in the user-centric AI knowledge base, e.g., a user-centric fact including a subject and/or object not yet included in any other user-centric fact in the user-centric AI knowledge base, or a user-centric fact including a new edge between a subject and object in the user-centric AI knowledge base. "Updated user-centric fact" is used herein to refer to a modification of a user-centric fact that was already defined in the user-centric AI knowledge base, e.g., modification of a user-centric fact to include one or more new tags and/or enrichments. In some examples, the user-centric AI knowledge base is updated by a knowledge base updating machine, such as knowledge-base updating machine 1650 of FIG. 16.

Optionally, in some examples, at 1705, the new or updated user-centric fact includes an enrichment based on a computer-readable representation of the user input. For example, computerized personal assistant 1600 of FIG. 16 includes an enrichment adapter configured to output an enrichment based on the computer-readable representation of the user input. In other examples, the computer service may not include any enrichment adapters, but the new or updated user-centric fact may nevertheless include an enrichment, e.g., an enrichment may be added to the new or updated user-centric fact by an enrichment adapter of a graph storage machine included in an implementation of the user-centric AI knowledge base.

At 1706, the user-centric AI knowledge base may be updated via an update protocol useable by a plurality of different computer services (e.g., an update API as described above with reference to FIG. 14). At 1707, the update protocol may constrain a storage format of the new or updated user-centric fact to an application-agnostic data format. For example, computerized personal assistant 1600 of FIG. 16 includes knowledge base updating machine 1650 configured to update the user-centric AI knowledge base via an update API.

FIG. 18 shows an exemplary method 1800 for a computer service to serve queries using a user-centric AI knowledge base.

At 1801, method 1800 includes recognizing a computer-readable representation of a query associated with a particular user of the computer service. In some examples, the particular user may be recognized by an identity machine, e.g., identity machine 1630 of FIG. 16. In some examples, the particular user may be recognized based on login info associated with the computer service, and/or based on the user's ownership of a computer device executing the computer service (e.g., a mobile phone).

Optionally, at 1802, the query is a user query received via a natural language user interface, e.g., natural language user interface 1610 of FIG. 16. Accordingly, at 1803, the computer-readable representation of the query may be output by an NLP machine based on the user query, such as by NLP machine 1620 of FIG. 16. In some examples, the query includes a constraint based on a natural language feature of the user query, e.g., based on an intent, topic, and/or entity recognized from the user query. For example, if the user asks, "Who is an expert at Widgets?", the query may include a graph context constraint indicating that the answer should be related to "Widgets" and, based on recognizing that the user's intent was to find a specific person, an answer type constraint indicating that the answer should include user-centric facts where the subject and/or object is a person.

In some examples, the query may be a user context query to determine a current context of the user, and accordingly, the subset of user-centric facts may include one or more user-centric facts relating to the current context. In some examples, the query may indicate a state of the computer service, and accordingly, the one or more user-centric facts relating to the current context may include a user-centric fact relating to the state of the computer service. In some examples, method 1800 further comprises recognizing a computer-readable representation of a natural language feature defined by the state of the computer service, and accordingly, the one or more constraints include a constraint based on the natural language feature. In some examples, recognizing the computer-readable representation of the natural language feature may be performed by an NLP machine, such as NLP machine 1620 of FIG. 16.

At 1804, method 1800 includes querying a user-centric AI knowledge base associated with the particular user, via a query protocol useable by a plurality of different computer services (e.g., a query API as described above with reference to FIG. 15). In some examples, querying the user-centric AI knowledge base may be performed by a knowledge-base query machine, such as knowledge-base query machine 1660 of FIG. 16.

At 1805, the user-centric AI knowledge base may be updateable to include a new or updated user-centric fact via an update protocol useable by a plurality of different computer services (e.g., an update API as described above with reference to FIG. 14). At 1806, the update protocol may constrain a storage format of the new or updated user-centric fact to an application-agnostic data format.

At 1807, method 1800 includes outputting a response based on a subset of user-centric facts in the user-centric AI knowledge base satisfying one or more constraints defined by the computer-readable representation of the query.

At 1808, method 1800 optionally includes causing the computer service, or a cooperating computer service, to perform an action to assist the user based on the subset of user-centric facts in the user-centric AI knowledge base satisfying the one or more constraints defined by the computer-readable representation of the query. Causing the computer service to perform the action to assist the user may include outputting computer-readable instructions configured to cause the computer service, or a cooperating computer service, to perform the action to assist the user.

In some examples, the response based on the subset of user-centric facts in the user-centric AI knowledge base is output by an output subsystem, e.g., output subsystem 1670 of FIG. 16. For example, output subsystem 1670 may include a communication subsystem communicatively coupled, via a computer network, to a cooperating computer device implementing the cooperating computer service. Accordingly, outputting the computer-readable instructions may include sending the computer-readable instructions to the cooperating computer device via the computer network. In some examples, output subsystem 1670 may include a display device and the computer-readable instructions may be configured to cause the display device to visually present a depiction of state data of the computer service, the state data being related to the subset of user-centric facts in the user-centric AI knowledge base satisfying the one or more constraints defined by the query. Alternately or additionally, output subsystem 1670 may include a speaker and the computer-readable instructions may be configured to generate speech audio describing the state data of the computer service, and to cause the speaker to output the speech audio.

In some examples, a computer service may automatically provide facts to the user-centric AI knowledge base (e.g., according to method 1700 or in any other suitable manner using an update protocol of the user-centric AI knowledge base). For example, the computer service may continually monitor sensor and/or state data of the computer service, in order to provide facts which may pertain to a context of a user of the computer service, e.g., GPS data indicating a location of the user and clock data indicating a current time. Alternately or additionally, in some examples, the computer service may automatically issue queries to be served by the user-centric AI knowledge base (e.g., according to method 1800 or in any other suitable manner using a query protocol of the user-centric AI knowledge base). For example, the computer service may repeatedly issue a user context query according to a schedule, in order to monitor a context of the user (e.g., in order to automatically perform an action related to the context).

Computerized personal assistant 1600 may provide a wide range of assistance to a user (e.g., by providing information to the user, or by automatically performing a task for the user). In an example, computerized personal assistant 1600 may be configured to cooperate with a plurality of other computer services including an email program and a sensor monitoring program configured to output global positioning system (GPS) data indicating a position of a user device belonging to a user 1690 (e.g., a mobile phone). Computerized personal assistant 1600, the email program, and the sensor monitoring program may each provide one or more user-centric facts to a user-centric AI knowledge base, e.g., according to method 1700. For example, the email program may provide a new user-centric fact to the user-centric AI knowledge base whenever the user sends an email. The new user-centric fact may include an object graph node indicating user 1690's identity, a subject graph node indicating the recipient of the email, and an edge indicating the "sent email" relationship. The new user-centric fact may include one or more enrichments, e.g., an enrichment indicating a recognized topic of the email and a time-stamp indicating a time at which the email was sent. The sensor monitoring program may also provide one or more new user-centric facts to the user-centric AI knowledge base, for example, by continually monitoring a position of the user's mobile phone and providing a new user-centric fact indicating the location of the user's mobile phone and a corresponding time-stamp whenever the position of the user's mobile phone changes. Accordingly, the user-centric AI knowledge base may contain a plurality of user-centric facts indicating a position of user 1690's mobile phone, and a plurality of user-centric facts indicating each email that user 1690 sent.

Furthermore, the user-centric AI knowledge base may include additional user-centric facts (e.g., added by graph storage computer 1301) based on the enrichments of the new user-centric facts added by the email program and the new user-centric facts added by the sensor monitoring program. For example, the user-centric AI knowledge base may include an additional fact indicating that an email was likely sent from a particular location, based on comparing time-stamps associated with the email and time-stamps associated with facts provided by the sensor monitoring program.

Computerized personal assistant 1600 may later issue a query to be served by the user-centric AI knowledge base (e.g., via method 1800), in order to determine a location of a workplace of user 1690. For example, the query may include a graph context constraint indicating "work related emails" and an answer type constraint indicating "locations." Accordingly, the subset of user-centric facts selected responsive to the query may include locations from which user 1690 may have sent one or more work-related emails. Based on the subset of user-centric facts, computerized personal assistant 1600 may recognize that a large proportion of work-related emails were sent from a particular location, within a particular range of times. Accordingly, computerized personal assistant 1600 may recognize a location of user 1690's workplace and a work schedule of user 1690.

Later, in a similar fashion, the user-centric AI knowledge base may contain user-centric facts indicating that user 1690 frequently sets an alarm (e.g., on her mobile phone) from a particular location in the evening, and silences the alarm each subsequent morning. Accordingly, computerized personal assistant 1600 may issue a query regarding the location and timing of the alarm. Based on the response to the query, computerized personal assistant 1600 may recognize a home location of user 1690 and a sleep schedule of user 1690.

Computerized personal assistant 1600 may be able to automatically assist the user with a variety of tasks based on recognizing one or more aspects of user-centric facts in the user-centric AI knowledge base (e.g., by issuing queries according to method 1700). For example, when computerized personal assistant 1600 recognizes user 1690's work and sleep schedules as described above, computerized personal assistant 1600 may be able to set an alarm for the user by default, according to their typical scheduling preferences.

In some examples, as depicted in FIG. 16, computerized personal assistant 1600 may be able to provide an enhanced response to a user query based on the one or more aspects of the user-centric facts. For example, a user 1690 may ask computerized personal assistant 1600, "What is a good restaurant near work?" as shown in dialogue bubble 1691. Accordingly, computerized personal assistant 1600 may recognize a computer-readable representation of the query (e.g., according to method 1800 at 1801). Computerized personal assistant 1600 may issue the query to be served by the user-centric AI knowledge base (e.g., via a query protocol useable by a plurality of different computer services, as described at 1804). The query may include a graph context constraint indicating "near work" and an answer type constraint indicating "restaurants." Accordingly, computerized personal assistant 1600 may output a response to the query (e.g., as described at 1807) based on a subset of user-centric facts satisfying the graph context constraint and the answer type constraint. For example, computerized personal assistant 1600 may suggest one or more restaurants within a convenient distance of user 1690's work.

In some examples, computerized personal assistant 1600 may request more information from user 1690 in order to make a choice in accordance with user 1690's preferences. For example, when user 1690 asks to find a good restaurant near work, the subset of user-centric facts selected responsive to the query may indicate a plurality of different restaurants within a similar distance. Accordingly, computerized personal assistant 1600 might ask a follow-up question indicating a specific restaurant, e.g., "How about 'The Burrito Restaurant'?" as shown in dialogue bubble 1692.

In some examples, computerized personal assistant 1600 may provide one or more additional user-centric facts to the user-centric AI knowledge base in the course of answering a user query (e.g., according to methods 1700 and 1800). For example, user 1690 may reply to the question "How about 'The Burrito Restaurant'?" (shown in dialogue bubble 1692) by saying "I don't like burritos" as shown in dialogue bubble 1693. Accordingly, computerized personal assistant 1600 may add a new fact to the user-centric AI knowledge base indicating that the user does not like burritos.

In order to determine a choice of restaurant that satisfies the user's preferences, computerized personal assistant 1600 may ask an additional follow-up question, e.g., "How about 'The Sushi Restaurant?" as shown in dialogue bubble 1694. If user 1690 replies, "Yes, please reserve a table after work," as shown in dialogue bubble 1695, computerized personal assistant 1600 may infer a time at which to make the reservation based on recognizing user 1690's work schedule.

In addition to taking into account user 1690's work schedule, the user-centric AI knowledge base may enable computerized personal assistant 1600 to take into account other potentially relevant factors, e.g., factors associated with one or more user-centric facts included in the user-centric AI knowledge base. For example, the user-centric AI knowledge base may include user-centric facts describing when user 1690 typically prefers to eat. In some examples, the user-centric AI knowledge base may take into account factors determined based on additional facts outside of the user-centric knowledge base, for example, a predicted duration of travel from user 1690's work to "The Sushi Restaurant" as determined based on GPS data associated with a location of a user and the recognized work schedule. For example, computerized personal assistant 1600 may be configured to determine the predicted duration of travel via an API of a map service offering geolocation and transit planning functionality.

Based on when user 1690 typically leaves work, when user 1690 typically prefers to eat, and a predicted duration of travel from user 1690's work to "The Sushi Restaurant," computerized personal assistant 1600 may determine an appropriate time for the reservation, e.g., 6 PM. Accordingly, in response to the series of user queries and user inputs, computerized personal assistant may output a response to confirm that the reservation is being made as in dialogue bubble 1696 (e.g., according to method 1800 at 1807). Furthermore, computerized personal assistant 1600 may output computer-readable instructions configured to cause the computerized personal assistant 1600 and/or other cooperating computer services to perform an action to assist the user (e.g., according to method 1800 at 1808). For example, computerized personal assistant 1600 may output computer-readable instructions configured to arrange the reservation (e.g., via a restaurant reservation service offering an API for making reservations). Additionally, computerized personal assistant 1600 may recognize one or more new user-centric facts which may be added to the user-centric AI knowledge base, namely, that user 1690 does like sushi.

Based on interacting with and assisting user 1690, computerized personal assistant 1600 and other computer services may continually add new user-centric facts to the user-centric AI knowledge base, and issue queries in order to make informed decisions based on the user-centric facts in the user-centric AI knowledge base. Accordingly, the user-centric AI knowledge base may enable computerized personal assistant 1600 and other computer services to continually improve and to provide assistance to user 1690 in accordance with her preferences.

In some examples, computerized personal assistant 1600 may automatically issue a series of queries (e.g., according to a schedule) in order to automatically perform an action to assist user 1690, based on the subset of user-centric facts selected responsive to each query. For example, when user 1690 has a restaurant reservation at 'The Sushi Restaurant' at 6:00 PM, computerized personal assistant 1600 may be configured to repeatedly issue a user context query at a 2-minute interval between 5:30 PM and 6:00 PM. The user context query may include constraints related to the current time, a current activity of user 1690, and/or a location of the user based on GPS data, and the subset of user-centric facts selected responsive to the user context query may include one or more user-centric facts related to the restaurant reservation, e.g., based on a similarity of time-stamps and location information. Later, user 1690 may leave work at 5:50 PM and travel towards 'The Sushi Restaurant.' Accordingly, computerized personal assistant 1600 may recognize that user 1690 is approaching the restaurant and automatically assist user 1690 by visually presenting relevant information, e.g., a confirmation of the reservation, a restaurant menu, and a map showing directions to the destination.

In some embodiments, the methods and processes described herein may be tied to a computing system of one or more computing devices. In particular, such methods and processes may be implemented as a computer-application program or service, an application-programming interface (API), a library, and/or other computer-program product.

Figure 19:
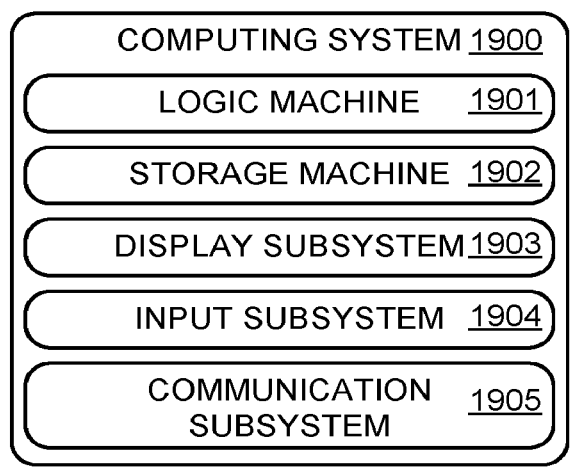
FIG. 19 schematically shows an example computing system for maintaining and querying a user-centric artificial intelligence knowledge base.

FIG. 19 schematically shows a non-limiting embodiment of a computing system 1900 that can enact one or more of the methods and processes described above. For example, computing system 1900 may serve as graph storage machine 1301, application-specific data provider computer 1321, or user computer 1340. In some examples, computing system 1900 may provide functionality of computerized personal assistant 1600 or any other computer service(s) configured to use a user-centric AI knowledge base (e.g., according to method 1700 or method 1800, or in any other suitable manner using an update protocol and/or query protocol of the user-centric AI knowledge base). Computing system 1900 is shown in simplified form. Computing system 1900 may take the form of one or more personal computers, server computers, tablet computers, home-entertainment computers, network computing devices, gaming devices, mobile computing devices, mobile communication devices (e.g., smart phone), and/or other computing devices.

Computing system 1900 includes a logic machine 1901 and a storage machine 1902. Computing system 1900 may optionally include a display subsystem 1903, input subsystem 1904, communication subsystem 1905, and/or other components not shown in FIG. 19.

Logic machine 1901 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1902 includes one or more physical devices configured to hold instructions executable by the logic machine to implement the methods and processes described herein. When such methods and processes are implemented, the state of storage machine 1902 may be transformed—e.g., to hold different data.

Storage machine 1902 may include removable and/or built-in devices. Storage machine 1902 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1902 may include volatile, nonvolatile, dynamic, static, read/write, read-only, random-access, sequential-access, location-addressable, file-addressable, and/or content-addressable devices.

Although storage machine 1902 includes one or more physical devices, aspects of the instructions described herein alternatively may be propagated by a communication medium (e.g., an electromagnetic signal, an optical signal, etc.) that is not held by a physical device for a finite duration.

Aspects of logic machine 1901 and storage machine 1902 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1900 implemented to perform a particular function. In some cases, a module, program, or engine may be instantiated via logic machine 1901 executing instructions held by storage machine 1902. The term "machine" may be used to describe one or more logic machines instantiating such modules, programs, or engines. For example, the natural language processing machine described herein may take the form of an ASIC or general purpose processor running software, firmware, or hardware instructions that translate raw user input (e.g., speech audio detected by a microphone) into a computer-readable representation of the input that is more suitable for downstream processing. It will be understood that different modules, programs, and/or engines may be instantiated on the same machine and/or from the same application, service, code block, object, library, routine, API, function, etc. Likewise, the same module, program, and/or engine may be instantiated across two or more different machines and/or by different applications, services, code blocks, objects, routines, APIs, functions, etc. The terms "module," "program," and "engine" may encompass individual or groups of executable files, data files, libraries, drivers, scripts, database records, etc.

When included, display subsystem 1903 may be used to present a visual representation of data held by storage machine 1902. This visual representation may take the form of a graphical user interface (GUI). As the herein described methods and processes change the data held by the storage machine, and thus transform the state of the storage machine, the state of display subsystem 1903 may likewise be transformed to visually represent changes in the underlying data. Display subsystem 1903 may include one or more display devices utilizing virtually any type of technology. Such display devices may be combined with logic machine 1901 and/or storage machine 1902 in a shared enclosure, or such display devices may be peripheral display devices.

When included, input subsystem 1904 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1905 may be configured to communicatively couple computing system 1900 with one or more other computing devices. Communication subsystem 1905 may include wired and/or wireless communication devices compatible with one or more different communication protocols. As non-limiting examples, the communication subsystem may be configured for communication via a wireless telephone network, ora wired or wireless local- or wide-area network. In some embodiments, the communication subsystem may allow computing system 1900 to send and/or receive messages to and/or from other devices via a network such as the Internet.

In an example, a computerized personal assistant comprises: a natural language user interface configured to receive user input; a natural language processing machine configured to output a computer-readable representation of the user input; an identity machine configured to associate the user input with a particular user; a knowledge-base updating machine configured to update a user-centric artificial intelligence knowledge base associated with the particular user to include a new or updated user-centric fact based on the computer-readable representation of the user input, wherein the knowledge-base updating machine updates the user-centric artificial intelligence knowledge base via an update protocol useable by a plurality of different computer services, the update protocol constraining a storage format of the new or updated user-centric fact to an application-agnostic data format. In this example or any other example, the computerized personal assistant further comprises an enrichment adapter configured to output an enrichment based on the computer-readable representation of the user input, wherein the new or updated user-centric fact includes the enrichment output by the enrichment adapter. In this example or any other example, the user-centric artificial intelligence knowledge base includes one or more encrypted user-centric facts, wherein access to the one or more encrypted user-centric facts is constrained by a credential associated with the particular user. In this example or any other example, the computerized personal assistant further comprises a knowledge-base query machine configured to query the user-centric artificial intelligence knowledge base associated with the particular user and to output a response based on a subset of user-centric facts in the user-centric artificial intelligence knowledge base satisfying one or more constraints defined by a computer-readable representation of a query. In this example or any other example, the knowledge-base query machine is configured to query the user-centric artificial intelligence knowledge base via a query protocol useable by a plurality of different computer services. In this example or any other example, the natural language user interface is further configured to receive a user query; and the natural language processing machine is further configured to output the computer-readable representation of the query based on the user query. In this example or any other example, the natural language processing machine is further configured to output a recognized user intent based on the user query, wherein the one or more constraints defined by the computer-readable representation of the query include a constraint based on the recognized user intent. In this example or any other example, the query is a user context query to determine a current context of the user, and the subset of user-centric facts includes one or more user-centric facts relating to the current context. In this example or any other example, the one or more constraints defined by the computer-readable representation of the query include an answer type constraint; and the subset of user-centric facts includes only user-centric facts that satisfy the answer type constraint. In this example or any other example, the one or more constraints defined by the computer-readable representation of the query include a graph context constraint; and the subset of user-centric facts includes only user-centric facts that are related to a contextualizing user-centric fact in the user-centric artificial intelligence knowledge base that satisfies the graph context constraint. In this example or any other example, the response output by the knowledge-base query machine includes computer-readable instructions configured to cause a cooperating computer service to perform an action to assist the user based on the subset of user-centric facts in the user-centric artificial intelligence knowledge base satisfying the one or more constraints defined by the computer-readable representation of the query. In this example or any other example, the action to assist the user includes changing a preference setting of the cooperating computer service based on the subset of user-centric facts in the user-centric artificial intelligence knowledge base satisfying the one or more constraints defined by the computer-readable representation of the query. In this example or any other example, the action to assist the user includes visually presenting a depiction of state data of the cooperating computer service, the state data related to the subset of user-centric facts in the user-centric artificial intelligence knowledge base satisfying the one or more constraints defined by the computer-readable representation of the query.

In an example, a computerized personal assistant comprises: a natural language user interface configured to receive a user query; an identity machine configured to associate the user query with a particular user; a natural language processing machine configured to output a computer-readable representation of the user query; a knowledge-base query machine configured to query a user-centric artificial intelligence knowledge base associated with the particular user and to output a response to the user query based on a subset of user-centric facts in the user-centric artificial intelligence knowledge base satisfying one or more constraints defined by the computer-readable representation of the user query, wherein the user-centric artificial intelligence knowledge base is updateable to include a new or updated user-centric fact via an update protocol useable by a plurality of different computer services, the update protocol constraining a storage format of the new or updated user-centric fact to an application-agnostic data format.

In an example, a method for automatically responding to queries comprises: recognizing a computer-readable representation of a query associated with a particular user of a computer service; querying a user-centric artificial intelligence knowledge base associated with the particular user via a query protocol useable by a plurality of different computer services; and outputting a response based on a subset of user-centric facts in the user-centric artificial intelligence knowledge base satisfying one or more constraints defined by the computer-readable representation of the query, wherein the user-centric artificial intelligence knowledge base is updateable to include a new or updated user-centric fact via an update protocol useable by a plurality of different computer services, the update protocol constraining a storage format of the new or updated user-centric fact to an application-agnostic data format. In this example or any other example, the computer service is a computerized personal assistant. In this example or any other example, the query is a user context query to determine a current context of the user, wherein the subset of user-centric facts includes one or more user-centric facts relating to the current context. In this example or any other example, the query indicates a state of the computer service and the one or more user-centric facts relating to the current context include a user-centric fact relating to the state of the computer service. In this example or any other example, the method further comprises recognizing a computer-readable representation of a natural language feature defined by the state of the computer service, wherein the one or more constraints include a constraint based on the natural language feature. In this example or any other example, the method further comprises causing the computer service to perform an action to assist the user based on the subset of user-centric facts in the user-centric artificial intelligence knowledge base satisfying the one or more constraints defined by the computer-readable representation of the query.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A computer system comprising:
one or more computer processors; and
computer memory storing computer-useable instructions that, when used by the one or more computer processors, cause the one or more computer processors to perform operations comprising:
receiving a query;
querying a user-centric artificial intelligence knowledge base comprising a graph data structure that stores a plurality of user-centric facts, the user-centric artificial intelligence knowledge base further comprising an application-agnostic data format that is associated with a node record format that supports a facet pointer to auxiliary application-specific data associated with application-specific facts of application-specific contexts where users interact with a plurality of different computer services;
selecting a subset of user-centric facts that satisfy the set of constraints defined by the query, wherein the user-centric facts comprise one or more application-specific facts, the one or more application-specific facts are associated with corresponding auxiliary application-specific data having facet pointers that support retrieving and storing the auxiliary application-specific data; and
caching the subset of user-centric facts responsive to the query as a cached response.

2. The system of claim 1, wherein the query is a slice query indicating a start node and a distance parameter, and wherein the subset of user-centric facts includes user-centric facts reached by starting at the start node and traversing a number of edges equal to at most the distance parameter away from the start node.

3. The system of claim 1, wherein the query is a rank query to rank the plurality of user-centric facts based at least on a confidence value associated with each user-centric fact, and the subset of user-centric facts is ranked in order according to the confidence value of each user-centric fact.

4. The system of claim 1, the operations further comprising caching the query as a cached query.

5. The system of claim 4, the operations further comprising:
receiving a second query;
determining that the second query corresponds to the cached query; and
based on the cached query, outputting the cached response.

6. The system of claim 1, wherein a user-centric fact stored in the graph data structure is an application-specific fact, and the graph data structure stores for the application-specific fact an enrichment that includes an application-agnostic fact associated with the application-specific fact.

7. The system of claim 1, wherein the facet pointer supports multiple file types for storing different kinds of auxiliary application-specific data associated with the auxiliary application-specific facts of the application-specific contexts.

8. One or more hardware computer storage media storing computer-useable instructions that, when used by one or more computing devices, cause the one or more computing devices to perform operations comprising:
receiving a query;
querying a user-centric artificial intelligence knowledge base comprising a graph data structure that stores a plurality of user-centric facts, the user-centric artificial intelligence knowledge base further comprising an application-agnostic data format that is associated with a node record format that supports a facet pointer to auxiliary application-specific data associated with application-specific facts of application-specific contexts where users interact with a plurality of different computer services;
selecting a subset of user-centric facts that satisfy the set of constraints defined by the query, wherein the user-centric facts comprise one or more application-specific facts, the one or more application-specific facts are associated with corresponding auxiliary application-specific data having facet pointers that support retrieving and storing the auxiliary application-specific data; and
caching the subset of user-centric facts responsive to the query as a cached response.

9. The media of claim 8, wherein the query is a slice query indicating a start node and a distance parameter, and wherein the subset of user-centric facts includes user-centric facts reached by starting at the start node and traversing a number of edges equal to at most the distance parameter away from the start node.

10. The media of claim 8, wherein the query is a rank query to rank the plurality of user-centric facts based at least on a confidence value associated with each user-centric fact, and the subset of user-centric facts is ranked in order according to the confidence value of each user-centric fact.

11. The media of claim 8, the operations further comprising caching the query as a cached query.

12. The media of claim 11, the operations further comprising:
receiving a second query;
determining that the second query corresponds to the cached query; and
based on the cached query, outputting the cached response.

13. The media of claim 8, wherein a user-centric fact stored in the graph data structure is an application-specific fact, and the graph data structure stores for the application-specific fact an enrichment that includes an application-agnostic fact associated with the application-specific fact.

14. The media of claim 8, wherein the facet pointer supports multiple file types for storing different kinds of auxiliary application-specific data associated with the auxiliary application-specific facts of the application-specific contexts.

15. A method comprising:
receiving a query;
querying a user-centric artificial intelligence knowledge base comprising a graph data structure that stores a plurality of user-centric facts, the user-centric artificial intelligence knowledge base further comprising an application-agnostic data format that is associated with a node record format that supports a facet pointer to auxiliary application-specific data associated with application-specific facts of application-specific contexts where users interact with a plurality of different computer services;
selecting a subset of user-centric facts that satisfy the set of constraints defined by the query, wherein the user-centric facts comprise one or more application-specific facts, the one or more application-specific facts are associated with corresponding auxiliary application-specific data having facet pointers that support retrieving and storing the auxiliary application-specific data; and caching the subset of user-centric facts responsive to the query as a cached response.

16. The method of claim 15, wherein the query is a slice query indicating a start node and a distance parameter, and wherein the subset of user-centric facts includes user-centric facts reached by starting at the start node and traversing a number of edges equal to at most the distance parameter away from the start node.

17. The method of claim 15, wherein the query is a rank query to rank the plurality of user-centric facts based at least on a confidence value associated with each user-centric fact, and the subset of user-centric facts is ranked in order according to the confidence value of each user-centric fact.

18. The method of claim 15, the method further comprising caching the query as a cached query.

19. The method of claim 15, the method further comprising:

receiving a second query;

determining that the second query corresponds to the cached query; and based on the cached query, outputting the cached response.

20. The method of claim 15, wherein a user-centric fact stored in the graph data structure is an application-specific fact, and the graph data structure stores for the application-specific fact an enrichment that includes an application-agnostic fact associated with the application-specific fact; and wherein the facet pointer supports multiple file types for storing different kinds of auxiliary application-specific data associated with the auxiliary application-specific facts of the application-specific contexts.

* * * * *